US012317143B2

(12) United States Patent
Damnjanovic et al.

(10) Patent No.: US 12,317,143 B2
(45) Date of Patent: May 27, 2025

(54) MOBILITY ENHANCEMENTS FOR CONDITIONAL HANDOVERS AND CARRIER AGGREGATION

(71) Applicant: QUALCOMM Incorporated, San Diego, CA (US)

(72) Inventors: Jelena Damnjanovic, Del Mar, CA (US); Tao Luo, San Diego, CA (US); Aleksandar Damnjanovic, Del Mar, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 17/452,670

(22) Filed: Oct. 28, 2021

(65) Prior Publication Data

US 2023/0139950 A1   May 4, 2023

(51) Int. Cl.
*H04W 36/00* (2009.01)
*H04W 36/08* (2009.01)

(52) U.S. Cl.
CPC ... *H04W 36/0069* (2018.08); *H04W 36/0094* (2013.01); *H04W 36/08* (2013.01)

(58) Field of Classification Search
CPC ......... H04W 36/0058; H04W 36/0061; H04W 36/0066; H04W 36/0069;
(Continued)

(56) References Cited

U.S. PATENT DOCUMENTS

2015/0312776 A1* 10/2015 Cui ................ H04L 5/0032
370/328
2015/0327094 A1* 11/2015 Lee ................ H04W 76/15
370/252
(Continued)

FOREIGN PATENT DOCUMENTS

EP   3986015 A1   4/2022
EP   4044673 A1   8/2022
(Continued)

OTHER PUBLICATIONS

Ericsson: "Remaining Open Issues for CHO", 3GPP TSG-RAN WG2 #108, R2-1914634, 3rd Generation Partnership Project, Mobile Competence Centre, 650, Route Des Lucioles, F-06921 Sophia-Antipolis Cedex, France, vol. RAN WG2, No. Reno, Nevada, USA, Nov. 18, 2019-Nov. 22, 2019, Nov. 7, 2019, pp. 1-14, XP051815693, 1 Introduction Measurements in Complete Messages to Target Cell, p. 11, 4 Conclusion.
(Continued)

*Primary Examiner* — Matthew W Genack
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may receive, from a source base station, configuration information for a conditional handover, where the configuration information indicates an execution condition and one or more carrier aggregation configurations associated with one or more candidate base stations, and where the execution condition is based at least in part on at least one of a beam-based measurement or a cell-based measurement and at least one of special cells or secondary cells (SCells) associated with the one or more candidate base stations. The UE may transmit, to a candidate base station of the one or more candidate base stations, a message to initiate the
(Continued)

conditional handover based at least in part on the execution condition having been satisfied. Numerous other aspects are described.

30 Claims, 10 Drawing Sheets

(58) Field of Classification Search
CPC ....... H04W 36/00837; H04W 36/0085; H04W 36/0088; H04W 36/0094; H04W 36/08; H04W 36/085; H04W 36/34; H04W 36/36; H04W 36/362
See application file for complete search history.

(56) References Cited

U.S. PATENT DOCUMENTS

| | | | |
|---|---|---|---|
| 2017/0367120 A1* | 12/2017 | Murray | H04B 7/0695 |
| 2020/0220582 A1* | 7/2020 | Wu | H04B 7/0408 |
| 2022/0007254 A1* | 1/2022 | Da Silva | H04W 36/0016 |
| 2022/0369179 A1* | 11/2022 | Ren | H04L 5/001 |
| 2023/0025432 A1* | 1/2023 | Da Silva | H04W 36/36 |

FOREIGN PATENT DOCUMENTS

| | | |
|---|---|---|
| WO | WO-2020248237 A1 | 12/2020 |
| WO | WO-2021088843 A1 | 5/2021 |

OTHER PUBLICATIONS

Ericsson: "TP for 38.331 on Conditional Handover", 3GPP TSG RAN WG2 #107, R2-1909344, 3rd Generation Partnership Project, Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 15, 2019, pp. 1-31, XP051767146, 1 Introduction, 5.5.3.1 General, 5.5.4.1 General.
International Search Report and Written Opinion—PCT/US2022/077193—ISA/EPO—Jan. 3, 2023.

* cited by examiner

MOBILITY ENHANCEMENTS FOR CONDITIONAL HANDOVERS AND CARRIER AGGREGATION

FIELD OF THE DISCLOSURE

Aspects of the present disclosure generally relate to wireless communication and to techniques and apparatuses for mobility enhancements for conditional handovers and carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive, from a source base station, configuration information for a conditional handover, where the configuration information indicates an execution condition and one or more carrier aggregation configurations associated with one or more candidate base stations, and where the execution condition is based at least in part on at least one of a beam-based measurement or a cell-based measurement, and where the execution condition is associated with at least one of special cells or secondary cells (SCells) associated with the one or more candidate base stations. The one or more processors may be configured to transmit, to a candidate base station of the one or more candidate base stations, a message to initiate the conditional handover based at least in part on the execution condition having been satisfied.

Some aspects described herein relate to a method of wireless communication performed by a UE. The method may include receiving, from a source base station, configuration information for a conditional handover, where the configuration information indicates an execution condition and one or more carrier aggregation configurations associated with one or more candidate base stations, and where the execution condition is based at least in part on at least one of a beam-based measurement or a cell-based measurement, and where the execution condition is associated with at least one of special cells or SCells associated with the one or more candidate base stations. The method may include transmitting, to a candidate base station of the one or more candidate base stations, a message to initiate the conditional handover based at least in part on the execution condition having been satisfied.

Some aspects described herein relate to a non-transitory computer-readable medium that stores a set of instructions for wireless communication by a UE. The set of instructions, when executed by one or more processors of the UE, may cause the UE to receive, from a source base station, configuration information for a conditional handover, where the configuration information indicates an execution condition and one or more carrier aggregation configurations associated with one or more candidate base stations, and where the execution condition is based at least in part on at least one of a beam-based measurement or a cell-based measurement, and where the execution condition is associated with at least one of special cells or SCells associated with the one or more candidate base stations. The set of instructions, when executed by one or more processors of the UE, may cause the UE to transmit, to a candidate base station of the one or more candidate base stations, a message to initiate the conditional handover based at least in part on the execution condition having been satisfied.

Some aspects described herein relate to an apparatus for wireless communication. The apparatus may include means for receiving, from a source base station, configuration information for a conditional handover, where the configuration information indicates an execution condition and one or more carrier aggregation configurations associated with one or more candidate base stations, and where the execution condition is based at least in part on at least one of a beam-based measurement or a cell-based measurement, and where the execution condition is associated with at least one of special cells or SCells associated with the one or more candidate base stations. The apparatus may include means for transmitting, to a candidate base station of the one or more candidate base stations, a message to initiate the conditional handover based at least in part on the execution condition having been satisfied.

Some aspects described herein relate to a base station for wireless communication. The base station may include a memory and one or more processors coupled to the memory. The one or more processors may be configured to transmit, to a source base station, configuration information for a conditional handover associated with a UE, where the configuration information indicates a carrier aggregation configuration associated with the base station, and where the conditional handover is associated with an execution condition that is based at least in part on at least one of a beam-based measurement or a cell-based measurement, and where the execution condition is associated with at least one of special cells or SCells. The one or more processors may be configured to receive, from the UE, a message to initiate the conditional handover based at least in part on the execution condition having been satisfied.

Some aspects described herein relate to a method of wireless communication performed by a base station. The method may include transmitting, to a source base station, configuration information for a conditional handover associated with a UE, where the configuration information indicates a carrier aggregation configuration associated with the base station, and where the conditional handover is associated with an execution condition that is based at least in part on at least one of a beam-based measurement or a cell-based measurement, and where the execution condition is associated with at least one of special cells or SCells. The method may include receiving, from the UE, a message to initiate the conditional handover based at least in part on the execution condition having been satisfied.

Some aspects described herein relate to a non-transitory computer-readable medium that stores a set of instructions for wireless communication by a base station. The set of instructions, when executed by one or more processors of the base station, may cause the base station to transmit, to a source base station, configuration information for a conditional handover associated with a UE, where the configuration information indicates a carrier aggregation configuration associated with the base station, and where the conditional handover is associated with an execution condition that is based at least in part on at least one of a beam-based measurement or a cell-based measurement, and where the execution condition is associated with at least one of special cells or SCells. The set of instructions, when executed by one or more processors of the base station, may cause the base station to receive, from the UE, a message to initiate the conditional handover based at least in part on the execution condition having been satisfied.

Some aspects described herein relate to an apparatus for wireless communication. The apparatus may include means for transmitting, to a source base station, configuration information for a conditional handover associated with a UE, where the configuration information indicates a carrier aggregation configuration associated with the apparatus, and where the conditional handover is associated with an execution condition that is based at least in part on at least one of a beam-based measurement or a cell-based measurement, and where the execution condition is associated with at least one of special cells or SCells. The apparatus may include means for receiving, from the UE, a message to initiate the conditional handover based at least in part on the execution condition having been satisfied.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
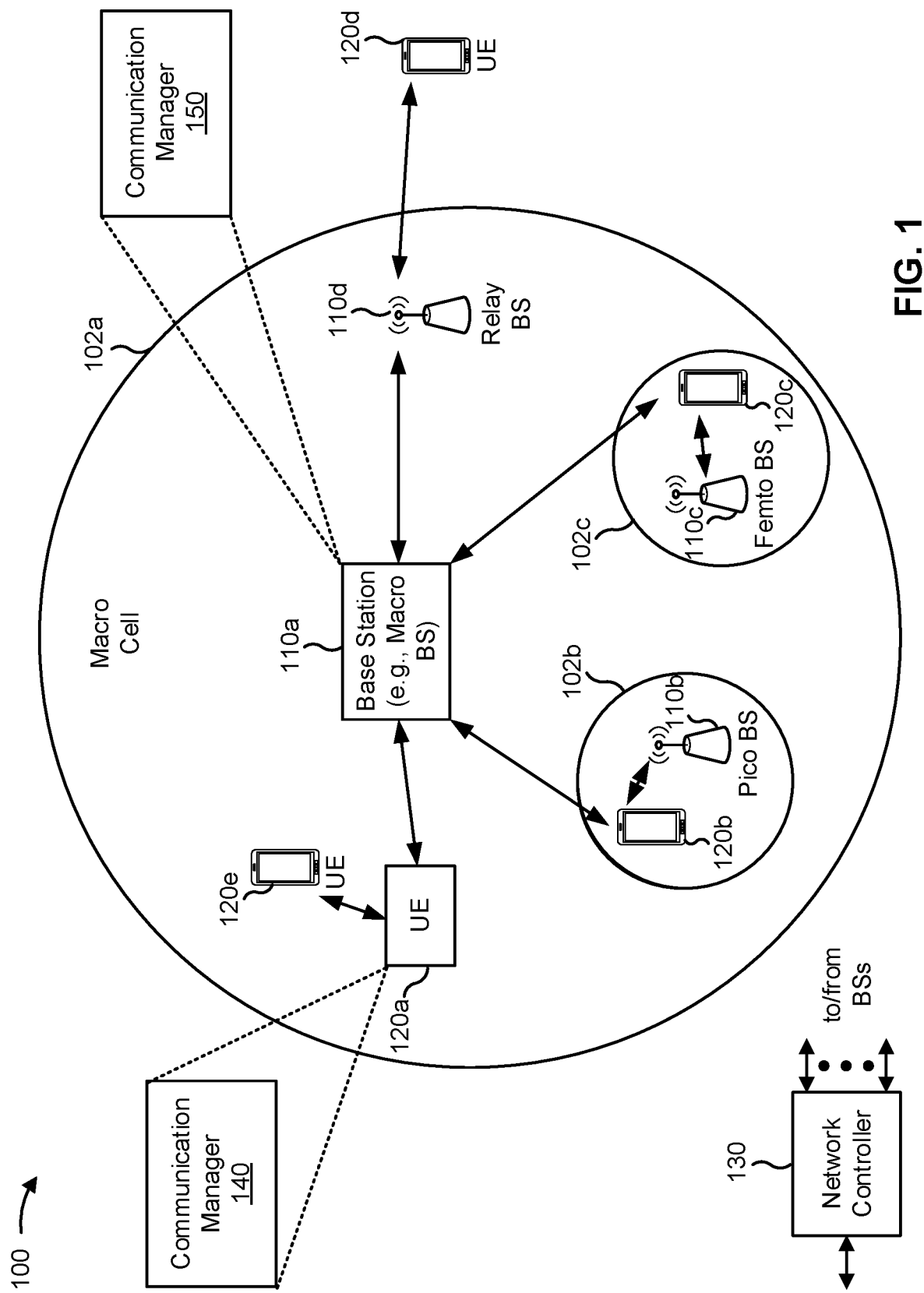
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a source base station, configuration information for a conditional handover, where the configuration information indicates an execution condition and one or more carrier aggregation configurations associated with one or more candidate base stations, and where the execution condition is based at least in part on at least one of a beam-based measurement or a cell-based measurement, and where the execution condition is associated with at least one of special cells or secondary cells (SCells) associated with the one or more candidate base stations; and transmit, to a candidate base station of the one or more candidate base stations, a message to initiate the conditional handover based at least in part on the execution condition having been satisfied. Additionally, or alternatively, the communication manager 140 may perform one or more other operations described herein.

In some aspects, the base station 110 may include a communication manager 150. As described in more detail elsewhere herein, the communication manager 150 may transmit, to a source base station, configuration information for a conditional handover associated with a UE 120, where the configuration information indicates a carrier aggregation configuration associated with the base station, and where the conditional handover is associated with an execution condition that is based at least in part on at least one of a beam-based measurement or a cell-based measurement, and where the execution condition is associated with at least one of special cells or SCells; and receive, from the UE, a message to initiate the conditional handover based at least in part on the execution condition having been satisfied. Additionally, or alternatively, the communication manager 150 may perform one or more other operations described herein.

As indicated above, FIG. 1 is provided as an example. Other examples may differ from what is described with regard to FIG. 1.

Figure 2:
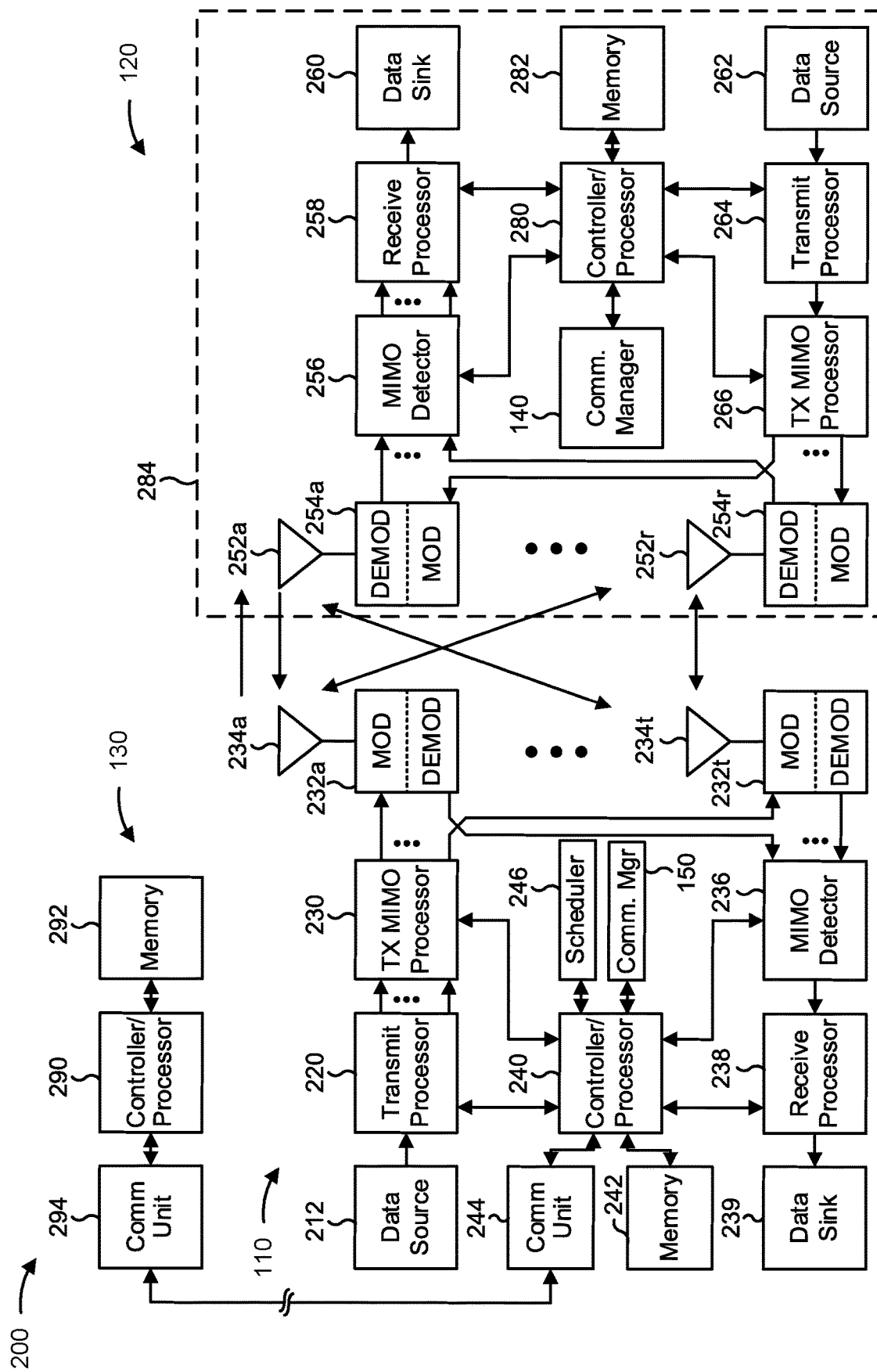
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with mobility enhancements for conditional handovers and carrier aggregation, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a source base station, configuration information for a conditional handover, where the configuration information indicates an execution condition and one or more carrier aggregation configurations associated with one or more candidate base stations, and where the execution condition is based at least in part on at least one of a beam-based measurement or a cell-based measurement, and where the execution condition is associated with at least one of special cells or SCells associated with the one or more candidate base stations; and/or means for transmitting, to a candidate base station of the one or more candidate base stations, a message to initiate the conditional handover based at least in part on the execution condition having been satisfied. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a source base station, configuration information for a conditional handover associated with a UE 120, where the configuration information indicates a carrier aggregation configuration associated with the base station, and where the conditional handover is associated with an execution condition that is based at least in part on at least one of a beam-based measurement or a cell-based measurement, and where the execution condition is associated with at least one of special cells or SCells; and/or means for receiving, from the UE, a message to initiate the conditional handover based at least in part on the execution condition having been satisfied. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
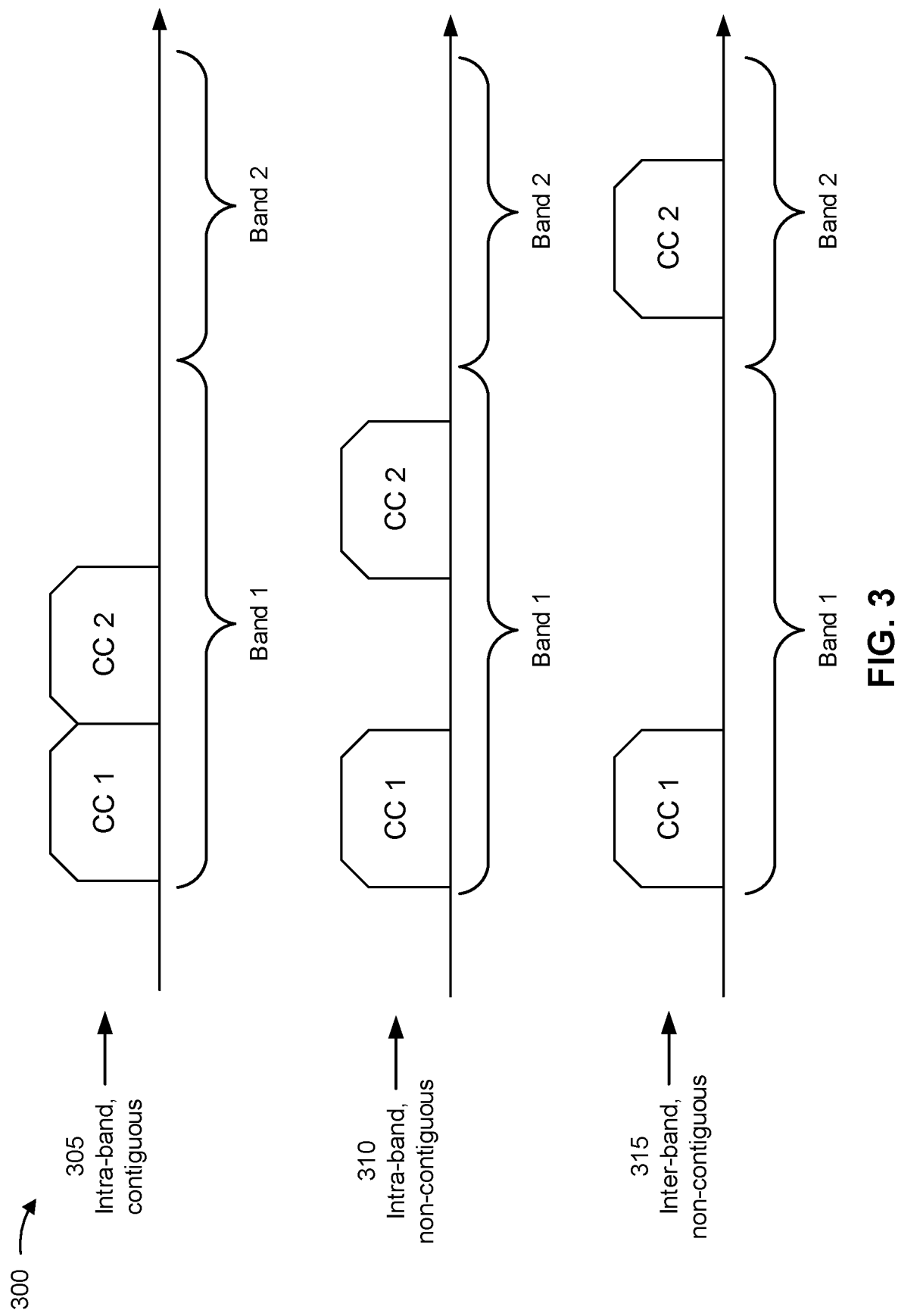
FIG. 3 is a diagram illustrating examples of carrier aggregation, in accordance with the present disclosure.

FIG. 3 is a diagram illustrating examples 300 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in a radio resource control (RRC) message, downlink control information (DCI), and/or another signaling message. For example, a base station 110 may configure carrier aggregation for a UE 120 after establishing a connection (e.g., an RRC connection) with the UE 120, such as after performing and/or completing a handover procedure.

As shown by reference number 305, in some examples, carrier aggregation may be configured in an intra-band contiguous mode where the aggregated carriers are contiguous to one another and are in the same band. As shown by reference number 310, in some examples, carrier aggregation may be configured in an intra-band non-contiguous mode where the aggregated carriers are non-contiguous to one another and are in the same band. As shown by reference number 315, in some examples, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). "primary carrier" and "PCell" may be used interchangeably herein. Similarly, "secondary carrier" and "SCell" may be used interchangeably herein. In some examples, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

In some examples, the UE 120 may operate in an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, examples described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NRDC mode, and/or another type of dual connectivity mode.

A UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In some examples, the eNB and the gNB may be co-located at the same base station 110. In some other examples, the eNB and the gNB may be included in different base stations 110 (e.g., may not be co-located).

A wireless network that permits operation in a 5G NSA mode may permit such operations using an MCG for a first RAT (e.g., an LTE RAT or a 4G RAT) and an SCG for a second RAT (e.g., an NR RAT or a 5G RAT). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some examples, the gNB and the eNB may not transfer user plane information between one another. In some examples, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some examples, the MCG may be associated with a first frequency band (e.g., a sub-6 GHz band and/or an FR1 band) and the SCG may be associated with a second frequency band (e.g., a millimeter wave band and/or an FR2 band). In the context of dual connectivity, an MCG may be a group of serving cells associated with a first base station associated and may include a PCell and optionally one or more SCells. Further, an SCG is a group of serving cells associated with a second base station and may include a primary secondary cell (PScell) and optionally one or more SCells.

As used herein, "special cell" may refer to a PCell of an MCG and/or a PSCell of an SCG (e.g., if dual connectivity operation is enabled for the UE 120). If dual connectivity operation is not enabled for the UE 120, "special cell" may refer to a PCell. Special cell may also be referred to as "SpCell."

As indicated above, FIG. 3 is provided as an example. Other examples may differ from what is described with regard to FIG. 3.

Figure 4:
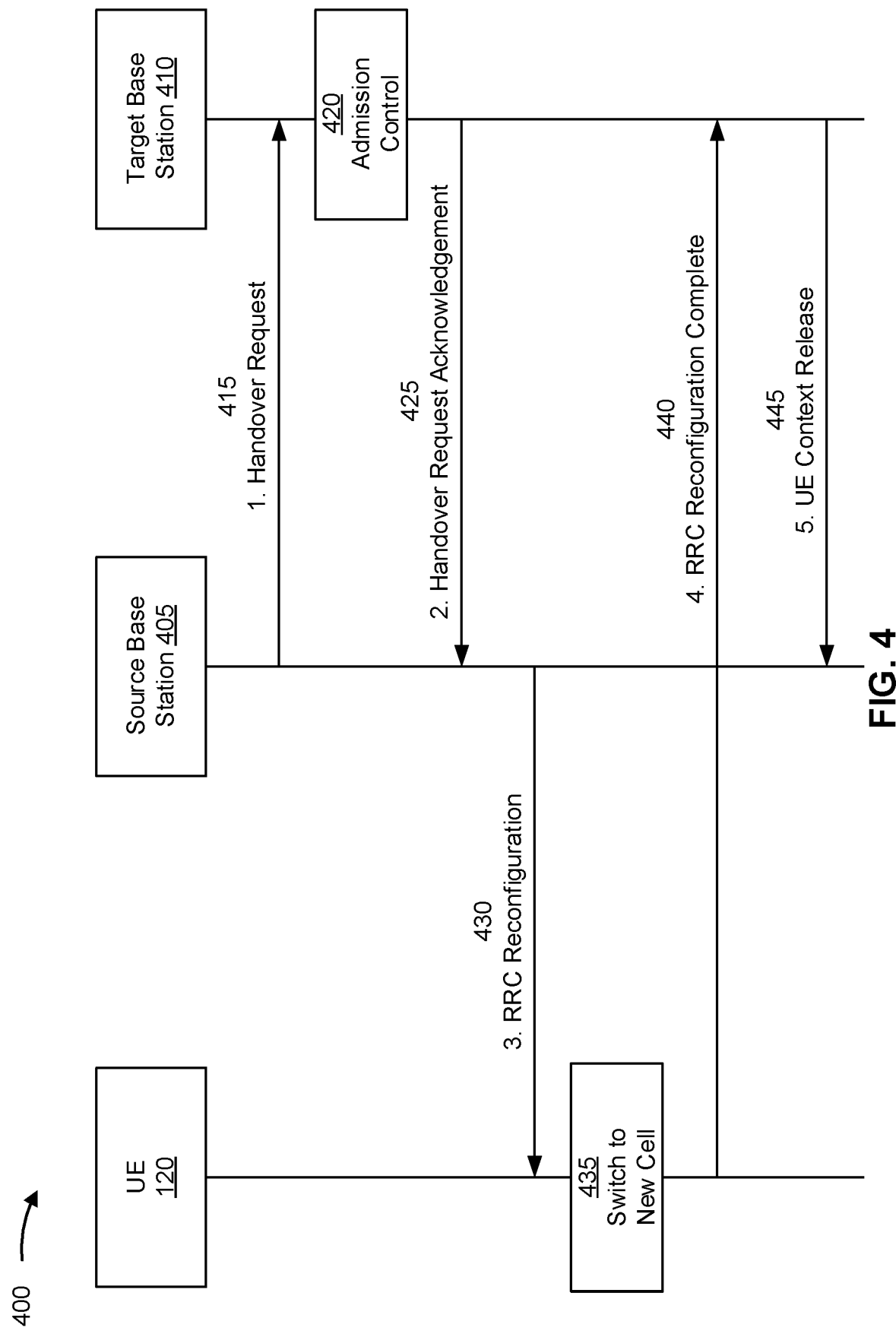
FIG. 4 is a diagram illustrating an example of a handover procedure, in accordance with the present disclosure.

FIG. 4 is a diagram illustrating an example of a handover procedure 400, in accordance with the present disclosure. The handover procedure may be performed by a UE 120, a source base station 405 (e.g., a base station 110), and a target base station 410 (e.g., another base station 110). As used herein, "source base station" may refer to a serving base station or a base station with which the UE 120 currently has an active or established connection, such as an RRC connection in a connected or active state. "Target base station" may refer to a base station that is identified as a base station to replace a serving base station for a UE 120 (e.g., as part on a handover procedure). In some examples, the source base station 405 may be associated with a PCell and the target base station 410 may be associated with a target cell to replace the source base station 405 as the PCell.

As shown in FIG. 4, and by reference number 415, the source base station 405 may initiate handover of the UE 120 to the target base station 410 by transmitting a handover request message to the target base station 410. The source base station 405 may transmit the handover request message to the target base station 410 over an Xn, X2, or a next generation application protocol (NGAP) interface, among other examples. As shown by reference number 420, the target base station 410 may perform admission control procedures associated with the handover based at least in part on receiving the handover request message. As shown by reference number 425, the target base station 410 may transmit a handover request acknowledgement message to the source base station 405 (e.g., if the admission control procedures indicate that the target base station 410 can accept the handover of the UE 120). The handover request acknowledgement message may include an RRC configuration for connection to the target base station 410.

As shown by reference number 430, the source base station 405 may transmit the RRC configuration to the UE 120 by forwarding the RRC configuration of the handover request acknowledgement message to the UE 120. As shown by reference number 435, the UE 120 may change an RRC connection from the source base station 405 to the target base station 410 based at least in part on the RRC configuration. As shown by reference number 440, the UE 120 may transmit an RRC reconfiguration complete message to the target base station 410. The RRC reconfiguration complete message may indicate that the UE 120 has changed the RRC connection from the source base station 405 to the target base station 410. As shown by reference number 445, the target base station 410 may transmit a UE context release message to the source base station 405. The UE context release message may indicate that the handover of the UE 120 to the target base station 410 was successful.

In some examples, the UE 120 may be unable to successfully connect with the target base station 410. For example, the UE 120 may attempt to connect with the target base station 410 (e.g., by performing a random access channel (RACH) procedure with the target base station 410), but the attempt to connect with the target base station 410 may fail. If the UE 120 is unable to successfully connect with the target base station 410, then the UE 120 may perform a connection re-establishment procedure to re-establish a connection with the source base station 405 or another base station 110. For example, the UE 120 may transmit an RRC re-establishment request message to the network (e.g., to the source base station 405 or another base station 110). Additionally, the UE 120 may reset a medium access control (MAC) entity of the UE 120, release the RRC configuration for the handover procedure, suspend all radio bearers (except SRB0 in some examples), release a connection with any configured SCells, or release all other configurations stored by the UE 120, among other examples. Therefore, the UE 120 may re-establish an RRC connection (e.g., with the source base station 405 or another base station 110) in the event that the handover procedure with the target base station 410 fails.

As indicated above, FIG. 4 is provided as an example. Other examples may differ from what is described with regard to FIG. 4.

Figure 5:
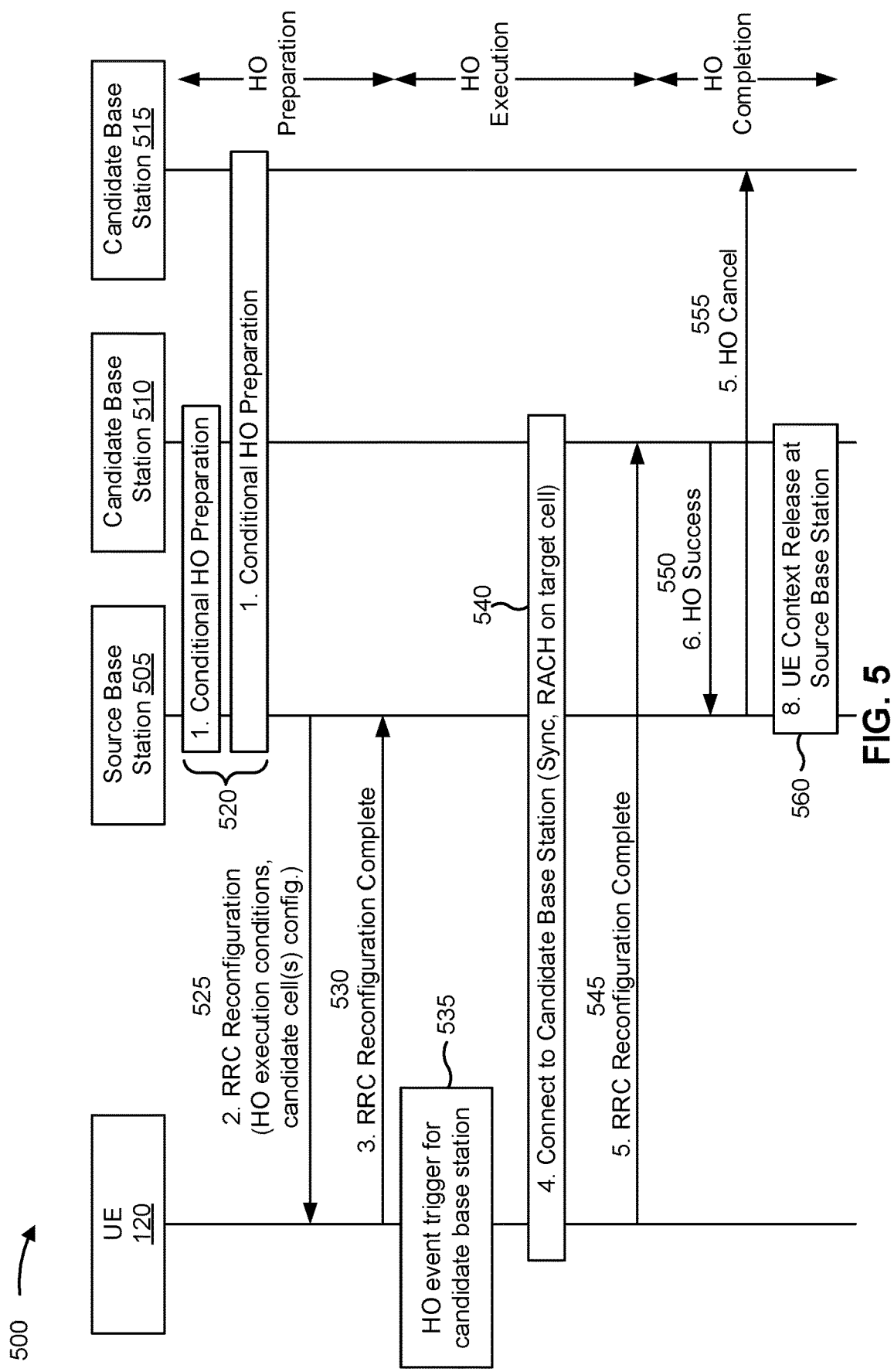
FIG. 5 is a diagram illustrating an example of a conditional handover procedure, in accordance with the present disclosure.

FIG. 5 is a diagram illustrating an example of a conditional handover procedure 500, in accordance with the present disclosure. The conditional handover procedure 500 may be performed by a UE 120, a source base station 505 (e.g., a base station 110 or the source base station 405), and one or more candidate base stations 510, 515. As used herein, "candidate base station" may refer to a base station that is a candidate to serve as a target base station for the UE as part of a handover procedure. In some examples, the source base station 505 may be associated with a PCell and the candidate base stations 510, 515 may be associated with a target cell to replace the source base station 505 as a PCell.

As shown in FIG. 5, and by reference number 520, the source base station 505 may communicate with a first candidate base station 510 and a second candidate base station 515 to prepare the first and second candidate base stations 510, 515 for a conditional handover of the UE 120. For example, the source base station 505 may transmit a handover request message to the first candidate base station 510 or the second candidate base station 515. The first candidate base station 510 or the second candidate base station 515 may transmit a handover request acknowledgement message to the source base station 505, as described above in connection with FIG. 4. As shown by reference number 525, the source base station 505 may transmit an RRC reconfiguration message to the UE 120. The RRC reconfiguration message may include a conditional handover configuration that indicates configurations for the candidate base stations 510, 515, indicates one or more criteria or execution conditions (e.g., conditional thresholds) that trigger handover, among other examples. As shown by reference number 530, the UE 120 may transmit an RRC reconfiguration complete message to the source base station 505, which may indicate that the UE 120 has applied the RRC reconfiguration (e.g., the conditional handover configuration).

As shown by reference number 535, the UE 120 may detect a conditional handover event for the first candidate base station 510. For example, the UE 120 may determine that the one or more criteria or execution conditions for triggering handover to the first candidate base station 510 are satisfied (e.g., a measurement associated with a signal transmitted by the second candidate base station 515 may satisfy a threshold or may be greater than (by a threshold amount) a measurement associated with a signal transmitted by the source base station 505). As shown by reference number 540, the UE 120 may change an RRC connection from the source base station 505 to the first candidate base station 510, as described above in connection with FIG. 4, based at least in part on detecting the conditional handover event or execution condition for the first candidate base station 510. That is, the UE 120 may execute the handover upon detecting the conditional handover event, and not wait for an RRC reconfiguration message from the source base station 505. This may reduce handover latency.

As shown by reference number 545, the UE 120 may transmit an RRC reconfiguration complete message to the first candidate base station 510. The RRC reconfiguration complete message may indicate that the UE 120 has changed an RRC connection from the source base station 505 to the first candidate base station 510, as described above in connection with FIG. 4. As shown by reference number 550, the first candidate base station 510 may transmit a handover success message (e.g., indicating successful handover of the UE 120) to the source base station 505. As shown by reference number 555, the source base station 505 may transmit a handover cancel message to the second candidate base station 515. The handover cancel message may indicate that the second candidate base station 515 is to discard the handover request message (e.g., transmitted as described in connection with reference number 520). As shown by reference number 560, the source base station 505 and the first candidate base station 510 may perform a UE context release procedure to release the UE 120 context at the source base station 505.

In a similar manner as described above in connection with FIG. 4, the UE 120 may be unable to establish a connection with the first candidate base station 510. For example, the handover procedure with the first candidate base station 510 may fail. In some examples, the UE 120 may attempt to perform a RACH procedure with the first candidate base station 510, but the RACH procedure may be unsuccessful. In some examples, rather than releasing one or more (or all) RRC configurations at the UE 120 when the handover procedure with the first candidate base station 510 fails, the UE 120 may maintain the conditional handover configuration. This may enable the UE 120 to continue to search for or measure candidate base stations indicated by the conditional handover configuration. For example, the UE 120 may detect a conditional handover event for the second candidate base station 515. For example, the UE 120 may determine that the one or more criteria or execution condition(s) for triggering handover to the second candidate base station 515 are satisfied (e.g., after the handover attempt with the first candidate base station 510 fails). Because the UE 120 has not released the conditional handover configuration, the UE 120 may change an RRC connection from the source base station 505 to the second candidate base station 515, as described above in connection with FIG. 4, based at least in part on detecting the conditional handover event for the second candidate base station 515. That is, the UE 120 may execute the handover upon detecting that an execution condition is satisfied, and not wait for an RRC reconfiguration message from the source base station 505. Moreover, the UE 120 may not wait for an additional conditional handover reconfiguration after the handover attempt with the first candidate base station 510 fails. This may reduce handover latency associated with conditional handovers.

In some cases, a candidate base station (such as the first candidate base station 510 or the second candidate base station 515) may transmit, to a source base station 505, a carrier aggregation configuration associated with the candidate base station. For example, the candidate base station may transmit the carrier aggregation configuration as part of a conditional handover procedure preparation. The candidate base station may transmit the carrier aggregation configuration to the source base station 505 in a handover request acknowledgement message. The carrier aggregation configuration may indicate information for special cells or one or more SCells associated with the carrier aggregation configuration. The candidate base station may determine the carrier aggregation configuration based at least in part on one or more measurements indicated to the candidate base station by the source base station (e.g., in a handover request message). For example, the UE 120 may perform one or more measurements (such as of signals transmitted by the source base station or one or more candidate base stations). The UE 120 may transmit, to the source base station 505, an indication of the one or more measurements in a measurement report. The source base station 505 may provide an indication of the measurements (performed by the UE 120) to the candidate base station to enable the candidate base station to make decisions regarding configurations (such as a carrier aggregation configuration) for the conditional handover procedure.

However, as described above, some time may pass between a time when the conditional handover is configured and a time when the conditional handover is triggered. Channel conditions may change between the time when the conditional handover is configured and the time when the conditional handover is triggered. For example, cells (such as a special cell or an SCell) originally configured in the carrier aggregation by the candidate base station may be experiencing poor channel conditions (e.g., a low signal quality or a low signal strength) for the UE 120 at the time that the conditional handover is triggered. In other words, the candidate base station may determine the carrier aggregation configuration associated with the conditional handover procedure using measurements that are outdated by the time when the conditional handover is triggered. Moreover, execution conditions for the conditional handover may be based at least in part on special cell measurements (by the UE 120) of the candidate base station. For example, the UE 120 may not take measurements of a secondary cell (e.g., an SCell) when determining whether the conditional handover has been triggered. Therefore, the UE 120 may trigger the conditional handover procedure with the candidate base station when channel conditions associated with an SCell of the candidate base station are poor. As a result, the UE 120 may experience a failure associated with attempting to add, or connect with, the SCell of the candidate base station as part of applying carrier aggregation when performing the conditional handover procedure.

Additionally, the UE 120 may rely on cell-based measurements for determining whether an execution condition (e.g., for triggering the conditional handover procedure) has been satisfied. As used herein, "cell-based measurement" may refer to a measurement of a signal that indicates a measurement parameter (e.g., signal quality, signal strength, or another measurement parameter) for an entire cell. For example, the measurements used by the UE 120 for determining whether an execution condition (e.g., for triggering the conditional handover procedure) has been satisfied may be based on a filtered measurement corresponding to a cell. However, some wireless networks, such as 5G wireless networks or millimeter wave wireless networks, use beams to communicate messages. For example, a UE and a base station may use a beam (e.g., associated with a given spatial direction) to communicate. Therefore, using a cell-based measurement to determine whether an execution condition (e.g., for triggering the conditional handover procedure) has been satisfied may result in a conditional handover procedure being triggered with a candidate base station that uses a beam to communicate with the UE that is associated with a poor signal quality or a poor signal strength. For example, because measurements of different beams are not considered by the UE when determining whether an execution condition (e.g., for triggering the conditional handover procedure) has been satisfied, the UE may experience poor channel conditions using a given beam associated with the candidate base station.

Some techniques and apparatuses described herein enable mobility enhancements for conditional handovers and carrier aggregation associated with conditional handovers. For example, a UE may perform a conditional handover such that a carrier aggregation configuration at a target base station may be applied or configured as part of performing the conditional handover. The UE may perform measurements of a source base station and one or more candidate base stations associated with the conditional handover procedure (e.g., after the conditional handover procedure is initially configured). Some aspects relate to providing execution conditions for a conditional handover procedure that are associated with a carrier aggregation configuration. For example, the UE may consider measurements or information associated with a special cell and/or one or more SCells of a candidate base station when determining whether an execution condition (for triggering the conditional handover procedure) has been satisfied. In some aspects, an execution condition for the conditional handover may be based at least in part on beam-based measurements or beam-level measurements (e.g., rather than only cell-based measurements). "Beam-based measurement" may refer to a measurement of a signal that is performed using a given beam (e.g., defined or indicated by a transmission configuration indicator (TCI) state). For example, an execution condition associated with the conditional handover procedure may be based at least in part on Layer 1 beam-based measurements (e.g., where Layer 1 filtering is applied to the measurement) or Layer 3 beam-based measurements (e.g., where Layer 3 filtering is applied to the measurement). "Layer 1" may also be referred to as a "Physical (PHY) layer." "Layer 3" may also be referred to as an "RRC Layer."

As a result, mobility for a UE may be improved. In some aspects, the described techniques can be used to improve a likelihood that carrier aggregation may be applied or established as part of a conditional handover procedure. Applying carrier aggregation may enhance data capacity for the UE. For example, in some aspects, an execution condition for a conditional handover procedure may be based at least in part on a measurement of an SCell or a secondary carrier associated with a candidate base station, thereby improving a likelihood that the SCell or the secondary carrier can be added as part of the conditional handover procedure. In some aspects, the described techniques can be used to enhance execution conditions of a conditional handover procedure by using beam-based measurements (rather than cell-based measurements). Using beam-based measurements provides a more precise measurement of candidate base stations, thereby improving a likelihood that a triggered conditional handover procedure is successful. For example, an execution condition of a conditional handover procedure may be based at least in part on a beam-based measurement of a special cell and/or one or more SCells of a candidate base station, thereby improving a likelihood that carrier aggregation can be successfully applied for a triggered conditional handover procedure. Additionally, in some aspects, a latency or delay associated with configuring carrier aggregation for the UE may be reduced because the UE is enabled to select a special cell and/or one or more SCells to be added for a target base station prior to completing the conditional handover procedure (e.g., rather than waiting for carrier aggregation to be configured after the conditional handover procedure is completed).

Figure 6:
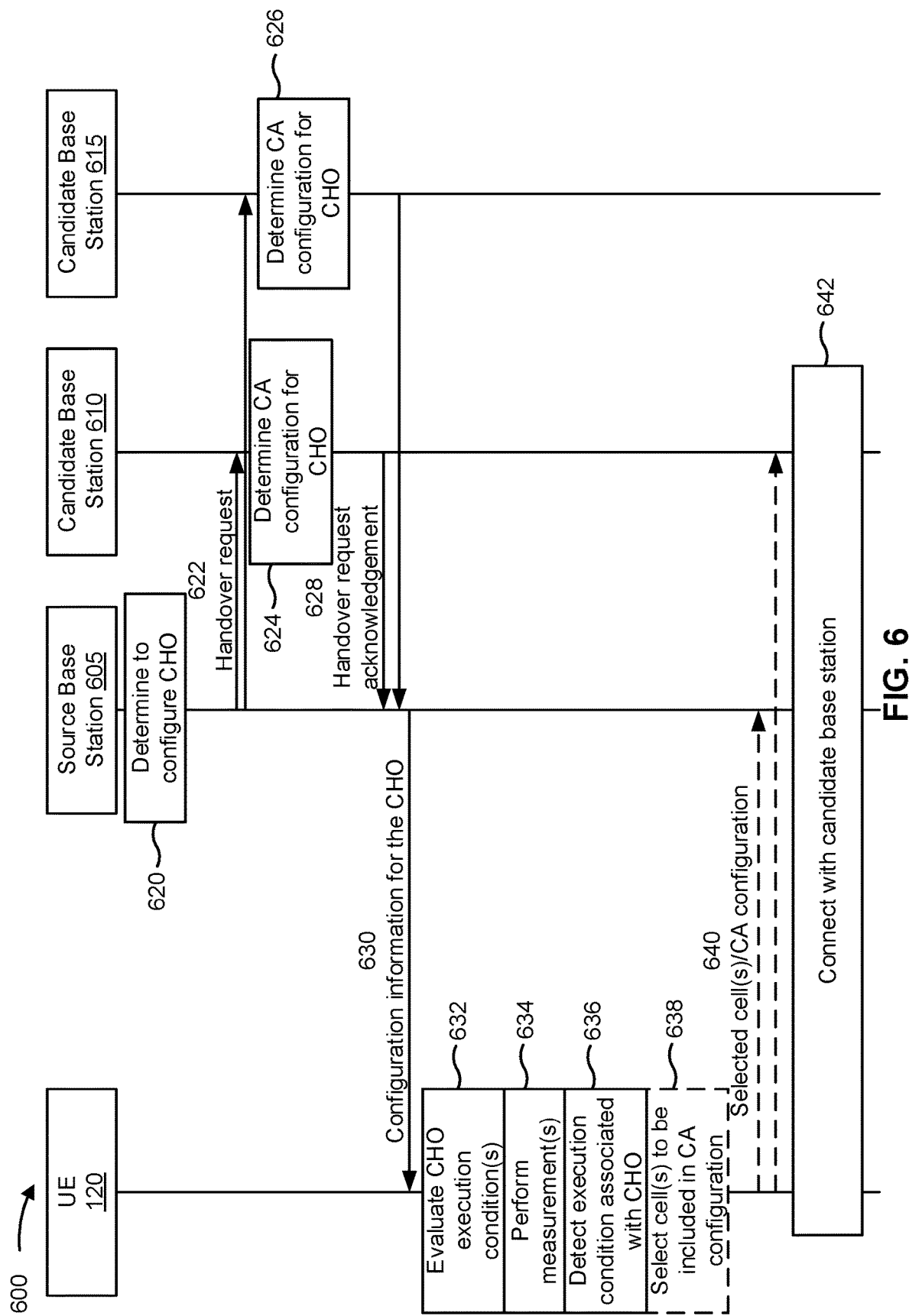
FIG. 6 is a diagram illustrating an example of mobility enhancements for conditional handovers and carrier aggregation, in accordance with the present disclosure.

FIG. 6 is a diagram illustrating an example 600 of mobility enhancements for conditional handovers and carrier aggregation, in accordance with the present disclosure. As shown in FIG. 6, a UE 120 may communicate (e.g., transmit an uplink transmission or receive a downlink transmission) with a source base station 605 (e.g., a base station 110), a first candidate base station 610 (e.g., a base station 110), and/or a second candidate base station 615 (e.g., a base station 110). The UE 120, the source base station 605, the first candidate base station 610, and/or the second candidate base station 615 may be part of a wireless network (such as the wireless network 100). The source base station 605 may be a serving base station for the UE 120. For example, the UE 120 may have an established connection (such as an RRC connection in an active or connected state) with the source base station 605. The first candidate base station 610 and/or the second candidate base station 615 may be candidate base stations for a handover procedure (such as a conditional handover procedure). For example, the first candidate base station 610 and the second candidate base station 615 may be associated with neighboring cell(s) to the source base station 605 (e.g., the first candidate base station 610 and the second candidate base station 615 may be geographically positioned proximate to the source base station 605). As used herein, "candidate base station" may refer to the first candidate base station 610, the second candidate base station 615, or any other candidate base station associated with the conditional handover procedure.

As shown by reference number 620, the source base station 605 may determine to configure a conditional handover (CHO) for the UE 120. For example, the source base station 605 may determine that one or more candidate base stations (or candidate cells), such as the first candidate base station 610 or the second candidate base station 615, should be configured for a conditional handover at the UE 120 (e.g., in a similar manner as described in connection with FIG. 5).

In some aspects, the source base station 605 may determine that the conditional handover should be configured at the UE 120 based at least in part on one or more measurements performed by the UE 120. For example, the source base station 605 may configure (e.g., as part of an RRC configuration) the UE 120 to perform one or more measurements of the source base station 605 or of neighboring base stations or cells (such as the first candidate base station 610 and the second candidate base station 615). For example, the source base station 605 may configure one or measurement objects for the UE 120 (e.g., indicating what is to be measured by the UE 120) as part of a measurement and reporting configuration. The UE 120 may transmit, to the source base station 605, one or more measurement reports (e.g., in accordance with a reporting configuration) that indicate measurement values of measurements performed by the UE 120. The UE 120 may perform inter-frequency measurements (e.g., associated with base stations or cells that use an operating frequency that is different than an operating frequency of the source base station 605) or intra-frequency measurements (e.g., associated with an operating frequency that is the same as an operating frequency of the source base station 605). The source base station 605 may determine that a conditional handover configuration should be transmitted to (e.g., configured for) the UE 120 based at least in part on one or more measurements indicated to the source base station 605 by the UE 120. In other words, the source base station 605 may determine whether a conditional handover should be configured based at least in part on measurement report information transmitted by the UE 120.

As shown by reference number 622, the source base station 605 may transmit, to the first candidate base station 610 and/or the second candidate base station 615, a handover request message. The handover request message may indicate that a candidate base station, or candidate cell, is to be configured (e.g., at the UE 120) as part of the conditional handover configuration. For example, the handover request message may indicate a request for the candidate base station to provide cell configuration information associated with the candidate base station for the conditional handover configuration. In some aspects, the handover request message may indicate measurement report information transmitted by the UE 120 to the source base station 605. For example, the source base station 605 may indicate, to each candidate base station, measurement report information (such as one or more measurements performed by the UE 120) to enable the candidate base station(s) to make the cell configuration determinations. In some aspects, the handover request message may indicate a request for the candidate base station to indicate candidate cell(s) (e.g., associated with the candidate base station) for a carrier aggregation (CA) configuration. For example, the handover request message may indicate a request for the candidate base station to configure one or more special cells and/or one or more SCells (e.g., that are associated with the candidate base station) that are available to be added as part of a carrier aggregation configuration associated with the candidate base station. Although FIG. 6 depicts two candidate base stations, the source base station 605 may transmit the handover request message to more candidate base stations or less candidate base stations.

As shown by reference number 624, the first candidate base station 610 may determine one or more cell configurations for the conditional handover. For example, the first candidate base station 610 may determine a carrier aggregation configuration for the conditional handover procedure. The cell configuration (e.g., the carrier aggregation configuration) may indicate one or more cells, associated with the first candidate base station 610, that are available to be added for carrier aggregation with the first candidate base station 610. For example, the cell configuration (e.g., the carrier aggregation configuration) may indicate one or more special cells (e.g., one or more primary carriers, PCells, and/or PSCells) and/or one or more SCells (e.g., one or more secondary carriers) associated with the first candidate base station 610. The first candidate base station 610 may determine the cell configuration (e.g., the carrier aggregation configuration) based at least in part on the measurement report information indicated via the handover request message.

For example, the first candidate base station 610 may determine a cell to serve as a special cell based at least in part on measurements of one or more cells (performed by the UE 120) associated with the first candidate base station 610. For example, the first candidate base station 610 may select a special cell at least in part on a cell, from a set of cells associated with the first candidate base station 610, that is associated with a highest measurement value (e.g., a highest RSRP and/or RSRQ). Similarly, the first candidate base station 610 may determine whether any SCells, associated with the first candidate base station 610, should be configured as part of the carrier aggregation configuration based at least in part on the measurement report information indicated via the handover request message. For example, the first candidate base station 610 may select one or more cells to be available as an SCell, for the carrier aggregation configuration, based at least in part on the measurements of one or more cells (performed by the UE 120) associated with the first candidate base station 610. In some aspects, the first candidate base station 610 may determine whether carrier aggregation should be configured as part of the conditional handover based at least in part on the measurements of one or more cells (e.g., performed by the UE 120) associated with the first candidate base station 610. For example, if no measurement values of SCells associated with the first candidate base station 610 satisfy a threshold, then the first candidate base station 610 may determine that carrier aggregation should not be configured as part of the conditional handover. If one or more measurement values of SCells associated with the first candidate base station 610 satisfy the threshold, then the first candidate base station 610 may determine that carrier aggregation should be configured as part of the conditional handover.

In some aspects, the first candidate base station 610 may determine a set of candidate cells that may be included in a carrier aggregation configuration for the first candidate base station 610. For example, the first candidate base station 610 may configure a set of cells for the UE 120 that can be used as a special cell or an SCell associated with the first candidate base station 610. For example, the first candidate base station 610 may select one or more groups (e.g., sets) of cells. Each group of cells may include a special cell and one or more SCells. The groups of cells may be overlapping groups (e.g., a cell, such as a special cell or an SCell, may be included in multiple groups). In some aspects, the first candidate base station 610 may select a single group. For example, the first candidate base station 610 may configure a single special cell and/or one or more SCells associated with the single special cell. In some other aspects, the first candidate base station 610 may select multiple groups. This may enable the source base station 605 or the UE 120 to select one or more cells, from the set of candidate cells, to be included in a carrier aggregation configuration for the first candidate base station 610 (e.g., as part of performing a conditional handover with the first candidate base station 610). For example, the UE 120 may be enabled to select (or add) a special cell and/or one or more SCells, associated with the first candidate base station 610, as explained in more detail elsewhere herein (e.g., at, or near, a time when the conditional handover is triggered). This may provide flexibility to the source base station 605 or the UE 120 to select a special cell and/or one or more SCells to be added for the first candidate base station 610, based at least in part on measurements performed by the UE 120, for the conditional handover at, or near, a time when the conditional handover is triggered, as explained in more detail elsewhere herein. In some aspects, the first candidate base station 610 may determine or identify one or more thresholds or conditions for selecting a candidate cell, from the set of candidate cells, as a special cell or an SCell (e.g., as part of performing a conditional handover with the first candidate base station 610).

As shown by reference number 626, the second candidate base station 615 may determine one or more cell configurations for the conditional handover. For example, the second candidate base station 615 may determine a carrier aggregation configuration associated with the second candidate base station 615 for the conditional handover. The second candidate base station 615 may determine the carrier aggregation configuration for the conditional handover in a similar (or the same) manner as described in connection with the reference number 624 and the first candidate base station 610.

As shown by reference number 628, the first candidate base station 610 and the second candidate base station 615 may transmit, to the source base station 605, handover request acknowledgement messages. For example, the first candidate base station 610 may transmit, and the source base station 605 may receive, a first handover request acknowledgement message. The first handover request acknowledgement message may indicate the one or more cell configurations (e.g., a carrier aggregation configuration, a set of candidate cells, and/or one or more special cell or SCells) associated with the first candidate base station 610 for the conditional handover procedure. The second candidate base station 615 may transmit, and the source base station 605 may receive, a second handover request acknowledgement message. The second handover request acknowledgement message may indicate the one or more cell configurations (e.g., a carrier aggregation configuration, a set of candidate cells, and/or one or more special cell or SCells) associated with the second candidate base station 615 for the conditional handover procedure.

As shown by reference number 630, the source base station 605 may transmit, and the UE 120 may receive, configuration information for the conditional handover procedure. In some aspects, the UE 120 may receive configuration information from another device (e.g., from another base station 110 or another UE 120). In some aspects, the UE 120 may receive the configuration information via RRC signaling or MAC signaling (such as MAC control elements (MAC-CEs)). In some aspects, the configuration information may include an indication of one or more configuration parameters (e.g., already known to the UE 120 and/or hardcoded on the UE 120) for selection by the UE 120 or explicit configuration information for the UE 120 to use to configure the UE 120.

The configuration information may be transmitted via an RRC connection reconfiguration message. In some aspects, the configuration information may indicate cell configurations and/or carrier aggregation configurations for candidate base stations associated with the conditional handover procedure. For example, the UE 120 may receive, from the source base station 605, configuration information for a conditional handover, where the configuration information indicates one or more carrier aggregation configurations associated with one or more candidate base stations. For example, the source base station 605 may transmit, to the UE 120, the cell configurations and/or the carrier aggregation configurations that were transmitted to the source base station 605 by the candidate base stations (e.g., as described in connection with reference number 628). For example, the configuration information may indicate configurations of candidate cell(s) or candidate base station(s) associated with the conditional handover procedure. In some aspects, the configuration information may indicate a carrier aggregation configuration for one or more (or all) of the candidate base stations associated with the conditional handover procedure. A carrier aggregation configuration associated with a candidate base station may be determined by the candidate base station based at least in part on measurement report information indicated via a handover request message (from the source base station 605) as described in more detail elsewhere herein.

In some aspects, the configuration information may include an indication of one or more execution conditions associated with the conditional handover procedure. "Execution condition" may refer to one or more conditions that, when met or satisfied, trigger a handover procedure to a given candidate base station associated with the conditional handover procedure. The source base station 605 may determine the one or more execution conditions. An execution condition may be associated with a measurement of a signal transmitted by a candidate base station or a candidate cell. For example, if a measurement value (e.g., an RSRP measurement value or an RSRQ measurement value) of the signal transmitted by the candidate base station or the candidate cell satisfies a threshold indicated by the execution condition, or is greater than a measurement value of a signal transmitted by the source base station 605 by a threshold amount (e.g., a threshold amount that is indicated by the execution condition), then the execution condition may be met or satisfied.

As described above in connection with FIG. 5, a measurement type associated with the execution condition for a conditional handover procedure may be a cell-based measurement (e.g., a Layer 3 cell-based measurement) that indicates a measurement value of a cell as a whole. In some aspects, the one or more execution conditions indicated by the source base station 605 may be associated with beam-based measurements. A beam-based measurement may indicate a measurement value of a given beam that is associated with a cell (e.g., rather than for the cell as a whole). In some aspects, the one or more execution conditions indicated by the source base station 605 may be associated with Layer 1 beam-based measurements, Layer 3 beam-based measurements, and/or Layer 3 cell-based measurements, among other examples. As used herein, "Layer 1 measurement" may refer to a measurement that is obtained by applying Layer 1 filtering (e.g., a measurement that is performed or reported at Layer 1). "Layer 1" may refer to a physical (PHY) layer of a wireless communication device. As used herein, "Layer 3 measurement" may refer to a measurement that is obtained by applying Layer 3 filtering (e.g., a measurement that is performed or reported at Layer 3). "Layer 3" may refer to an RRC layer of a wireless communication device. Layer 1 filtering may remove an impact of noise associated with the measurement, whereas Layer 3 filtering may remove fast fading or reduce short term variations in the measurement results. For example, Layer 3 measurements may provide a longer term view of channel conditions, whereas Layer 1 measurements may provide a shorter term view of channel conditions (e.g., with less latency than a Layer 3 measurement). However, Layer 1 measurements may be associated with a higher level of variance (e.g., because only Layer 1 filtering is applied and Layer 3 filtering is not applied). A beam-based measurement may also be referred to as a beam level measurement. Similarly, a cell-based measurement may also be referred to as a cell level measurement.

For example, the one or more execution conditions may refer to beam-based measurements (e.g., Layer 1 beam-based measurements and/or Layer 3 beam-based measurements). The measurements may be performed, by the UE 120, using synchronization signal blocks (SSBs) and/or channel state information (CSI) reference signals (CSI-RSs). For example, the configuration information may indicate that the UE 120 is to measure SSBs and/or CSI-RSs transmitted by the source base station and/or candidate base stations to evaluate whether an execution condition has been satisfied or met. The configuration information may indicate that the measurements of the SSBs or CSI-RSs are to be beam-based (or beam level) measurements. For example, the one or more execution conditions associated with the conditional handover procedure may include a Layer 1 beam-based measurement execution condition, a Layer 3 beam-based measurement execution condition, and/or a Layer 3 cell-based measurement execution condition, among other examples.

In some aspects, the one or more execution conditions associated with the conditional handover procedure may include a first execution condition associated with a first beam quality measurement (e.g., RSRQ or RSRP), of a candidate base station, satisfying a first threshold or being greater than a second beam quality measurement of a serving beam associated with the source base station 605. For example, an execution condition may be associated with the UE 120 selecting a candidate base station that is associated with a best beam quality (e.g., a highest RSRQ measurement or a highest RSRP measurement). As another example, the one or more execution conditions associated with the conditional handover procedure may include a second execution condition associated with a quantity of beams, associated with one or more candidate base stations, having beam quality measurements that satisfy a second threshold or that are greater than the second beam quality measurement of the serving beam associated with the source base station 605. For example, an execution condition may be associated with a candidate base station (or multiple candidate base stations) being associated with at least N beams that have beam quality measurements (e.g., RSRQ values or RSRP values) that satisfy the second threshold or that are greater than the second beam quality measurement of the serving beam associated with the source base station 605.

In some aspects, an execution condition may include multiple conditions. For example, an execution condition may indicate that the first execution condition, described above, and the second execution condition must be met or satisfied to trigger the conditional handover procedure. In some aspects, an execution condition may include a combination of Layer 1 beam-based measurement condition(s), Layer 3 beam-based measurement condition(s), and/or Layer 3 cell-based measurement condition(s). For example, an execution condition may include a first condition that is based at least in part on a Layer 1 beam-based measurement and a second condition that is based at least in part on a Layer 3 beam-based measurement. As another example, an execution condition may include a combination of beam-based measurement condition(s) and cell-based measurement condition(s). For example, an execution condition may include a first condition that is based at least in part on beam-based measurement (e.g., a Layer 1 beam-based measurement or a Layer 3 beam-based measurement) and a second condition that is based at least in part on cell-based measurement.

In some aspects, an execution condition may be associated with a quantity of occurrences that the execution condition has been satisfied, or associated with an amount of time that the execution condition has been satisfied. For example, an execution condition may include a first execution condition associated with a quantity of occurrences that a second execution condition has been satisfied or associated with an amount of time that the second execution condition has been satisfied. In other words, an execution condition may be associated with M measurements satisfying a threshold or other condition. In some other aspects, an execution condition may be associated with measurements associated with a candidate base station satisfying a threshold (or other condition) for a threshold amount of time. This may account for variance or volatility in measurement results that may be present when Layer 1 beam-based measurements are used for conditional handover execution conditions.

In some aspects, an execution condition may be based at least in part on a condition of an uplink beam associated with a downlink beam (e.g., used for at least one beam-based measurement for the conditional handover procedure). For example, in some aspects, an execution condition may be a maximum permissible exposure (MPE) based execution condition or an uplink transmit power-backoff based execution condition. For example, when transmitting in the millimeter wave frequency band, a transmitter may use a higher antenna gain as compared to transmitting in the sub-6 gigahertz (GHz) frequency band. As a result, the effective isotropic radiated power (EIRP), which represents the radiated power in a particular direction (e.g., the direction of the beam), may be higher for millimeter wave communications as compared to sub-6 GHz communications. To improve safety, some governing bodies have placed restrictions on the peak EIRP that can be directed toward the human body. These restrictions may be referred to as MPE limits, or MPE constraints, among other examples. In some aspects, an MPE limit may be due to a hand blocking scenario, where a hand of a user of the UE 120 blocks or obstructs communications to or from an antenna panel of the UE 120, or is otherwise positioned near the antenna panel. Additionally, or alternatively, the MPE limit may be due to the position of another body part of the user, such as the user's face, head, ear, or leg, among other examples.

When the UE 120 is subject to an MPE limit, a beam may be suitable as a downlink beam for use by the first wireless node to communicate with the second wireless node, but the beam may not be permitted for use as an uplink beam due to the MPE limit (or may be subjected to a decreased transmission power or transmit power-backoff due to the MPE limit). For example, a downlink beam may be received by the UE 120 (e.g., from a candidate base station) with a beam quality measurement or beam signal strength measurement that satisfies an execution condition. However, an uplink beam (of the UE 120) that is paired with the downlink beam (e.g., that is associated with the same, or similar, spatial direction) may be subjected to a decreased transmission power due to the MPE limit. Therefore, if the UE 120 were to trigger the conditional handover with the candidate base station, then uplink communications may experience degraded performance because of the decreased transmission power due to the MPE limit.

Therefore, if an uplink beam, paired with a downlink beam that satisfies an execution condition, is associated with a decreased transmission power due to an uplink condition (e.g., the MPE limit or another condition), then UE 120 may not select the associated candidate base station or candidate cell. In other words, the UE 120 may consider both downlink channel conditions (e.g., by measuring a signal received from a candidate base station) and uplink channel conditions (e.g., by evaluating uplink conditions, power transmit backoff conditions, and/or MPE conditions of uplink beams of the UE 120) as part of an execution condition for the conditional handover procedure. For example, MPE related aspects may be considered in a conditional handover execution condition. For example, if the UE 120 determines that there is an MPE limit associated with one or more uplink beams (e.g., even though a downlink measurement satisfies an execution condition and/or is a highest measurement value), then the UE 120 may select a different candidate cell (e.g., which may impact a special cell and/or an SCell selection by the UE 120). For example, the UE 120 may select a candidate base station as a target base station for the conditional handover based at least in part on a condition of an uplink beam associated with a downlink beam of another candidate base station, where the other candidate base station is associated with a downlink measurement value that is greater than a downlink measurement value associated with the candidate base station. This may improve a likelihood that a triggered conditional handover procedure is successful or may improve uplink channel conditions associated with triggered handover procedures.

In some aspects, the one or more execution conditions configured by the source base station 605 may be defined for special cells and/or for SCells. For example, the one or more execution conditions may include one or more execution conditions associated with special cells of the candidate base stations associated with the conditional handover procedure. Additionally, or alternatively, the one or more execution conditions may include one or more execution conditions associated with SCells of the candidate base stations associated with the conditional handover procedure. Therefore, the UE 120 may consider measurements of both special cells and SCells when evaluating whether to trigger a conditional handover procedure. This may improve a likelihood that carrier aggregation associated with a candidate base station is able to be added or applied as part of the conditional handover procedure.

For example, an execution condition configured by the source base station 605 may be associated with special cells of candidate base stations (e.g., a special cell only execution condition). In such examples, one or more SCells may be added (e.g., by a candidate base station) after performing the conditional handover procedure. For example, a target base station for the conditional handover may add (e.g., after performing the conditional handover procedure with the UE 120) one or more SCells for the UE 120 via an RRC configuration.

In some aspects, an execution condition configured by the source base station 605 may be associated with special cells of candidate base stations and SCells of the candidate base stations (e.g., a special cell and SCell execution condition). For example, an execution condition configured by the source base station 605 may include a first execution condition associated with special cells of the candidate base stations and/or a second execution condition associated with SCells of the candidate base stations, among other examples. In other words, the execution conditions for the conditional handover procedure may be based at least in part on measurements associated with special cells of candidate base stations in addition to measurements associated with SCells of the candidate base stations.

In some aspects, a triggering of the conditional handover procedure may be based at least in part on measurements associated with special cells of candidate base stations (e.g., and not measurements associated with SCells of the candidate base stations). However, the execution condition may indicate that the UE 120 is to add an SCell (e.g., when, or after, triggering the conditional handover procedure) based at least in part on the measurements associated with SCells of the candidate base stations. In other words, a decision by the UE 120 as to whether an SCell of a candidate base station (for which the conditional handover procedure has been triggered based at least in part on a measurement associated with a special cell of the candidate base station) is to be added as part of the conditional handover procedure may be based at least in part on an SCell execution condition being satisfied. For example, if a measurement associated with the SCell of the candidate base station satisfies a threshold, then the UE may add (e.g., may apply a configuration associated with) the SCell of the candidate base station as part of the conditional handover procedure. If the measurement associated with the SCell of the candidate base station does not satisfy the threshold, then the UE may not add (e.g., may not apply a configuration associated with) the SCell of the candidate base station as part of the conditional handover procedure.

In some aspects, a triggering of the conditional handover procedure may be based at least in part on measurements associated with special cells of candidate base stations and measurements associated with SCells of the candidate base stations. In other words, the execution condition may indicate that the UE 120 is to execute the conditional handover only if both special cell execution condition(s) and SCell execution condition(s) are met or satisfied. For example, the UE 120 may determine whether to trigger the conditional handover procedure based at least in part on one or more special cell execution conditions (that are based at least in part on measurements associated with special cells) and based at least in part on one or more SCell execution conditions (that are based at least in part on measurements associated with SCells) being satisfied or met. In other words, a triggering of the conditional handover procedure may be based at least in part on a measurement of a special cell of a candidate base station satisfying a first threshold and a measurement of at least one SCell of the candidate base station satisfying a second threshold. The first threshold and the second threshold may be the same threshold or different thresholds. This may ensure that carrier aggregation can be applied with the target base station because at least one SCell associated with the target base station may satisfy an execution condition.

The UE 120 may configure the UE 120 for communicating with the source base station 605, the first candidate base station 610, and the second candidate base station 615. In some aspects, the UE 120 may configure the UE 120 based at least in part on the configuration information for the conditional handover procedure. In some aspects, the UE 120 may be configured to perform one or more operations described herein (e.g., in connection with the conditional handover procedure). The UE 120 may configure the UE 120 for monitoring or evaluating one or more execution conditions that are indicated by the configuration information, as described in more detail elsewhere herein.

As shown by reference number 632, the UE 120 may evaluate one or more conditional handover execution conditions (e.g., that are indicated by the configuration information or the conditional handover configuration transmitted by the source base station 605). For example, the UE 120 may determine whether measurements associated with candidate cells (that are indicated by the configuration information) satisfy or meet the one or more conditional handover execution conditions. In some aspects, the UE 120 may determine whether a measurement associated with a candidate cell satisfies a threshold indicated by an execution condition. The UE 120 may continually evaluate the one or more conditional handover execution conditions until the source base station 605 indicates that the conditional handover is to be no longer configured at the UE 120 (e.g., via an RRC reconfiguration message).

As shown by reference number 634, the UE 120 may perform one or more measurements associated with the candidate base station(s) indicated by the configuration information. For example, the UE 120 may perform the one or more measurements based at least in part on a measurement configuration (that may be separate from the conditional handover configuration) transmitted by the source base station 605. The UE 120 may measure signals (e.g., reference signals or other signals) transmitted by the first candidate base station 610, the second candidate base station 615, and/or other candidate base stations. For example, the first candidate base station 610 and/or the second candidate base station 615 may transmit, and the UE 120 may receive, one or more SSBs, or one or more CSI-RSs, among other examples. The UE 120 may measure the reference signal(s) (e.g., the SSBs or CSI-RSs) transmitted by the candidate base station(s).

The measurements may be inter-frequency measurements or intra-frequency measurements. As described elsewhere herein, the measurements performed by the UE 120 may be beam-based measurements (e.g., beam level measurements) or cell-based measurements (e.g., cell level measurements). For example, the UE 120 may perform Layer 1 beam-based measurements, Layer 3 beam-based measurements, and/or Layer 3 cell-based measurements, among other examples. In some aspects, the measurements may be a combination of beam-based measurements and cell-based measurements. In some aspects, the measurements may be a combination of Layer 1 beam-based measurements and Layer 3 beam-based measurements. In some aspects, the measurements may be cell-based measurements only (e.g., in a scenario where the configuration information indicates that the execution condition(s) associated with the conditional handover procedure are cell-based measurement execution condition(s)). In some aspects, the UE 120 may perform measurements associated with special cells of the candidate base station(s). In some aspects, the UE 120 may perform measurements associated with SCells of the candidate base station(s). The UE 120 may use the measurement results (e.g., measurement values, such as beam quality measurement values, beam signal strength measurement values, RSRP values, or RSRQ values) to evaluate the one or more conditional handover execution conditions, as described in more detail elsewhere herein.

In some aspects, the UE 120 may transmit, and the source base station 605 may receive, a measurement report. The measurement report may indicate one or more measurements associated with the source base station 605 or one or more candidate base stations (such as the first candidate base station 610 or the second candidate base station 615). In some aspects, the measurement report may indicate a Layer 1 beam-based measurement, a Layer 3 beam-based measurement, and/or a Layer 3 cell-based measurement, among other examples. For example, the UE 120 may perform beam level and/or cell level measurements (e.g., using reference signals, such as SSBs or CSI-RSs, transmitted by the source base station or the candidate base station(s)) and may report the measurements to the source base station 605. The UE 120 may transmit the measurement report in accordance with a reporting configuration. For example, as described elsewhere herein, the source base station 605 may configure the UE 120 to perform measurements and to transmit measurement reports (e.g., periodically or based at least in part on detecting a reporting event) to the source base station 605 (for example, as part of an RRC configuration, such as a CSI measurement configuration (csi-MeasConfig) or a measurement configuration (measConfig)). For example, a measurement configuration may include a reporting configuration that indicates a reporting criterion, a reference signal type associated with the report, and a reporting format (e.g., indicating a quantity of measurement values to be included in the measurement report), among other examples.

The source base station 605 may transmit, to one or more candidate base stations associated with the conditional handover procedure, the measurement report or an indication of one or more measurement values indicated by the measurement report. For example, the source base station 605 may transmit, and the first candidate base station 610 may receive, the measurement report or an indication of one or more measurement values indicated by the measurement report. Similarly, the source base station 605 may transmit, and the second candidate base station 615 may receive, the measurement report or an indication of one or more measurement values indicated by the measurement report. In other words, the source base station 605 may forward an indication of one or more measurements performed by the UE 120 to one or more candidate base stations associated with the conditional handover procedure (e.g., after the conditional handover has been configured). Forwarding the indication of the one or more measurements performed by the UE 120 to the one or more candidate base stations may enable a candidate base station to update or reconfigure cell configurations or a carrier aggregation configuration associated with the candidate base station and the conditional handover procedure. The source base station 605 may transmit the measurement results to the candidate base station(s) based at least in part on a change in channel quality experienced by the UE 120. A candidate base station (such as the first candidate base station 610 or the second candidate base station 615) may indicate a reporting event (e.g., for reporting measurement results to the candidate base station) in the handover request acknowledgement message or in another message to the source base station 605. In some aspects, the source base station 605 may determine one or more reporting events. In some other aspects, one or more reporting events may be defined, or otherwise fixed, by a wireless communication standard, such as the 3GPP.

A candidate base station (e.g., the first candidate base station 610 or the second candidate base station 615) may update a carrier aggregation configuration associated with the candidate base station based at least in part on measurements reported to the candidate base station (e.g., measurements that are performed after the conditional handover configuration has been transmitted to the UE 120). For example, the candidate base station may determine a carrier aggregation configuration that is different than the carrier aggregation configuration that is transmitted to the source base station 605, as described above in connection with reference number 628. In some other aspects, the source base station 605 may determine an updated carrier aggregation configuration for a candidate base station (e.g., and may transmit an indication of the updated carrier aggregation configuration to the candidate base station). For example, the first candidate base station 610 may receive the indication of one or more measurements performed by the UE 120 and may evaluate the carrier aggregation configuration (or other cell configurations) associated with the first candidate base station 610 and the conditional handover procedure based at least in part on the one or more measurements performed by the UE 120. In some aspects, the first candidate base station 610 may determine that the carrier aggregation configuration is to be updated or modified to an updated carrier aggregation configuration based at least in part on the one or more measurements performed by the UE 120. The UE 120 may receive an indication of the updated carrier aggregation configuration (e.g., from the source base station 605 or the first candidate base station 610). For example, the updated carrier aggregation configuration may indicate one or more different special cells, one or more different SCells, and/or may indicate that an SCell has been added or removed from the carrier aggregation configuration. As a result, the candidate base stations are enabled to evaluate (or reevaluate) cell configurations (e.g., carrier aggregation configurations) for the conditional handover procedure based at least in part on current (or more recent) measurements performed by the UE 120 (e.g., based at least in part on measurements performed by the UE 120 and indicated to the candidate base stations after the candidate base stations determine initial cell configurations for the conditional handover procedure).

As shown by reference number 636, the UE 120 may detect that an execution condition associated with the conditional handover procedure is satisfied or met. For example, the UE 120 may detect that an execution condition (from the one or more execution conditions configured by the source base station 605 and described in more detail elsewhere herein) is satisfied or met. As described elsewhere herein, the execution condition may be an execution condition associated with a beam-based measurement, an execution condition associated with a cell-based measurement, an execution condition associated with a Layer 1 beam-based measurement, an execution condition associated with a Layer 3 beam-based measurement, an execution condition associated with a special cell, an execution condition associated with an SCell, and/or an execution condition associated with an uplink condition or an MPE condition or limit, among other examples. In some aspects, the UE 120 may determine that the execution condition is satisfied or met based at least in part on one or more measurements performed by the UE 120 (e.g., associated with the source base station 605 or a candidate base station).

For example, the UE 120 may determine that a conditional handover procedure is to be triggered with a candidate base station based at least in part on detecting that one or more execution conditions are met or satisfied. In some aspects, the UE 120 may determine that a conditional handover procedure is to be triggered based at least in part on a measurement of a special cell associated with a candidate base station satisfying an execution condition. In some other aspects, the UE 120 may determine that a conditional handover procedure is to be triggered based at least in part on a measurement of a special cell and a measurement associated with one or more SCells of the candidate base station satisfying an execution condition.

In some aspects, as shown by reference number 638, the UE 120 may select one or more cells, from a set of candidate cells associated with a carrier aggregation configuration, to be included in an updated carrier configuration based at least in part on one or more measurements performed by the UE 120. For example, the UE 120 may select one or more cells to be included in a carrier aggregation configuration for a target base station (e.g., a candidate base station for which the conditional handover has been triggered) based at least in part on one or more measurements performed by the UE 120. For example, the configuration information for the conditional handover procedure (transmitted by the source base station 605) may indicate, for a candidate base station, a set of candidate cells associated with a carrier aggregation configuration. In some aspects, the configuration information for the conditional handover procedure may indicate one or more conditions or criteria for the UE 120 to use to evaluate whether a candidate cell, from the set of candidate cells, should be selected or added by the UE 120. The UE 120 may use the one or more conditions or criteria and recent measurements (e.g., associated with the set of candidate cells) performed by the UE 120 to select the one or more cells, from the set of candidate cells, to be included in the carrier aggregation configuration that is applied as part of performing the conditional handover procedure. In some aspects, the UE 120 may select or add a special cell and/or one or more SCells for a candidate base station (e.g., a candidate base station for which the conditional handover has been triggered) based at least in part on measurements performed by the UE 120.

For example, the UE 120 may select the one or more cells, from the set of candidate cells, to be included in the carrier aggregation configuration that is applied as part of performing the conditional handover procedure based at least in part on detecting that the execution condition has been met or satisfied. For example, the UE 120 may detect that the conditional handover has been triggered for a candidate base station. The UE 120 may select the one or more cells, from the set of candidate cells associated with the candidate base station, to be included in the carrier aggregation configuration that is applied as part of performing the conditional handover procedure. In some aspects, the UE 120 may evaluate beam level measurements, cell level measurements, and/or MPE conditions (e.g., uplink conditions), among other examples, when selecting the one or more cells.

For example, the configuration information for the conditional handover procedure (e.g., transmitted by the source base station 605) may indicate, for a candidate base station, a set of special cells and/or a set of SCells. For example, a carrier aggregation configuration may indicate one or more sets of cells, for a candidate base station, where each set of cells includes a special cell and one or more SCells. In some aspects, a set of cells (e.g., a special cell and one or more SCells) for multiple candidate base stations may satisfy an execution condition for the conditional handover. In other words, measurement values of a special cell and/or SCell(s) associated with multiple candidate base stations may satisfy an execution condition associated with the conditional handover procedure. The UE 120 may select a candidate base station, from the multiple candidate base stations, based at least in part on one or more measurements performed by the UE 120. For example, the UE 120 may select the candidate base station, from the multiple candidate base stations, that is associated with a highest measurement value associated with the special cell. In other words, the UE 120 may select the candidate base station, from the multiple candidate base stations, based at least in part on only special cell measurements (e.g., based at least in part on the candidate base station being associated with a highest special cell signal quality or a highest special cell signal strength).

In some other aspects, the UE 120 may select the candidate base station, from the multiple candidate base stations, based at least in part on special cell information and SCell information. For example, the UE 120 may measure signals associated with a special cell of the one or more candidate base stations and may measure signals associated with SCells of the one or more candidate base stations, where measurements of a first set of a special cell and one or more SCells from a first candidate base station and a second set of a special cell and one or more SCells from a second candidate base station both satisfy the first condition and the second condition. The UE 120 may select a target base station, from the first candidate base station and the second candidate base station, for the conditional handover based at least in part on a measurement value of special cells included in the first set and the second set, a measurement value of special cells and SCells included in the first set and the second set, and/or a quantity of SCells included in the first set and the second set, among other examples. In other words, the UE 120 may select a target base station, from multiple candidate base stations that satisfy an execution condition, based at least in part on a best channel quality cell to serve as a special cell (e.g., while not considering the SCell(s) quality). As another example, the UE 120 may select a target base station, from multiple candidate base stations that satisfy an execution condition, based at least in part on a best joint special cell and SCell(s) quality (e.g., including a quantity of SCells that satisfy a configured execution condition). "Joint measurement" may refer to a measurement that takes both the special cell measurement and the SCell(s) measurement into account. For example, a joint measurement may be a highest measurement value from the special cell measurement value and the SCell(s) measurement value. In some aspects, the joint measurement may be an average of the special cell measurement value and the SCell(s) measurement value. In some aspects, the joint measurement may be some other combination of the special cell measurement value and the SCell(s) measurement value. In other words, the UE 120 may consider measurement values (e.g., signal qualities) of both the special cells and the SCell(s) when selecting a target base station for the conditional handover procedure.

In some aspects, the UE 120 may select the target base station based at least in part on a quantity of SCells that are associated with the target base station that can be added for carrier aggregation. For example, the UE 120 may select a target base station based at least in part on a quantity of the SCells that can be added by the UE 120 (e.g., that are associated with measurement values that satisfy a threshold or an execution condition). In other words, if a target base station is associated with more SCells that can be included in the carrier aggregation configuration after the conditional handover procedure is triggered, then the UE 120 may select the target base station over another candidate base station that has fewer SCells that can be included in a carrier aggregation configuration after the conditional handover procedure is triggered.

In some aspects, the UE 120 may select a special cell and/or an SCell based at least in part on an MPE condition or limit experienced by the UE 120. For example, as described in more detail elsewhere herein, the UE 120 may evaluate measurements of a candidate base station or candidate cells based at least in part on downlink signals. However, the UE 120 may consider uplink conditions (e.g., that may be affected by MPE conditions) when selecting a cell or cell configuration associated with the conditional handover procedure. For example, if an uplink beam, paired with a downlink beam (that is associated with a measurement value that has satisfied a threshold or condition associated with an execution condition as described herein) associated with a candidate cell (e.g., a downlink beam that satisfies a beam-based measurement execution condition), is associated with an MPE limit (that limits a transmission power using the uplink beam), then the UE 120 may refrain from selecting the candidate cell (e.g., the special cell or the SCell) to be included in the conditional handover.

In some aspects, as shown by reference number 640, the UE 120 may transmit, and the source base station 605 or a candidate base station may receive, an indication of selected cells or a carrier aggregation configuration associated with the candidate base station. For example, when the UE 120 updates a carrier aggregation configuration or selects cells (e.g., a special cell and/or or SCell(s)) that are not explicitly configured in the configuration information, the UE 120 may inform the source base station 605 or the candidate base station (e.g., the candidate base station that is the target base station for the triggered conditional handover) of the decisions made by the UE 120 (e.g., of the selected cells or the updated carrier aggregation configuration). For example, if the first candidate base station 610 is selected as the target base station (e.g., by the UE 120) for the conditional handover, then the UE 120 may transmit, and the first candidate base station 610 may receive, an indication of an updated carrier aggregation configuration, an indication of a selected special cell and/or an indication of one or more selected SCells, among other examples. For example, the UE 120 may transmit, to the source base station 605 or the candidate base station, an indication of one or more SCells associated with the candidate base station that have been added by the UE 120 as part of the conditional handover for a carrier aggregation configuration associated with the candidate base station. For example, the one or more SCells may be added by the UE based at least in part on a measurement of the one or more SCells satisfying the execution condition(s) for the conditional handover procedure.

In some aspects, such as where the UE 120 transmits the indication of the carrier aggregation configuration and/or the selected cell(s) to the source base station 605, the source base station 605 may transmit (e.g., forward), and the first candidate base station 610 may receive (e.g., when the first candidate base station 610 is selected as the target base station), the indication(s) provided by the UE 120 (e.g., the cell selection(s) made by the UE 120). The UE 120 may transmit the indication(s) (to the source base station 605 or the target base station) via Layer 3 signaling, Layer 2 signaling, Layer 1 signaling, RRC signaling (e.g., in an RRC reconfiguration complete message), uplink control information (UCI) signaling, MAC signaling (for example, using one or more MAC-CEs), and/or a message using a scheduling request (SR) resource of an SCell that has been added by the UE 120, among other examples. For example, the UE 120 may transmit a signal using an SR resource of an SCell that has been added by UE 120 to indicate that the SCell has been added by the UE 120. In this way, the target base station (e.g., the first candidate base station 610) may identify a special cell and any SCell(s) that have been added by the UE 120 as part of the conditional handover procedure. This may enable the cell configurations for the conditional handover to be synchronized between the UE 120 and the target base station (e.g., the first candidate base station 610) when the UE 120 makes selections, updates, or modifications to the cell configurations based at least in part on measurements performed by the UE 120.

As shown by reference number 642, the UE 120 and the target base station (e.g., the first candidate base station 610) may establish a connection. For example, the UE 120 may apply the cell configuration(s) associated with the target base station. The UE 120 may transmit a message, to the target base station, to initiate the conditional handover procedure (e.g., based at least in part on detecting that an execution condition has been satisfied). For example, the UE 120 may initiate a RACH procedure with the target base station (e.g., the first candidate base station 610) based at least in part on the selected special cell and/or SCell(s) (e.g., that were updated or selected based at least in part on measurements performed by the UE 120 after the initial conditional handover configuration is transmitted, as explained in more detail elsewhere herein). For example, the UE 120 may transmit the message to initiate the conditional handover to a special cell that is selected by the UE 120. The UE 120 and the first candidate base station 610 may establish the connection using a carrier aggregation configuration that is associated with the first candidate base station 610. For example, the UE 120 may add (e.g., may apply a cell configuration associated with) a special cell and/or one or more SCells that are indicated by the configuration information for the conditional handover procedure. For example, the carrier aggregation configuration used by the UE 120 and the first candidate base station 610 may indicate a special cell and one or more SCells, associated with the first candidate base station 610, that are added by the UE 120 as part of the conditional handover.

In some aspects, the conditional handover procedure may be associated with an initial beam. The initial beam may be a beam used by the UE 120 or the target base station to establish a connection between the UE 120 and the target base station (e.g., a beam used as part of a RACH procedure). In some aspects, the initial beam may be based at least in part on beam level measurements performed by the UE 120 (e.g., Layer 1 beam-based measurements or Layer 3 beam-based measurements) associated with one or more cells (e.g., a special cell or an SCell) of the target base station. For example, the beam level measurements may be based at least in part on a reference signal, such as an SSB or a CSI-RS, transmitted by the one or more cells (e.g., a special cell or an SCell) of the target base station (e.g., the first candidate base station 610). In some aspects, the initial beam may be a common beam (e.g., the same beam) for a special cell and one or more SCells associated with a carrier aggregation configuration applied by the UE 120 and/or the target base station. In some other aspects, an initial beam for a special cell and an initial beam for an SCell may be based at least in part on beam-based measurements associated with the special cell and the SCell. For example, the UE 120 may measure a special cell and an SCell associated with the target base station associated with the conditional handover to identify a first beam associated with a highest measurement value for the special cell and a second beam associated with a highest measurement value for the SCell. The UE 120 may establish a connection with the target base station using the first beam for the special cell and the second beam for the SCell.

In some aspects, the UE 120 may transmit an indication of the initial beam (and other beam information, such as beam measurement values or TCI state information) to the source base station 605 and/or the target base station. For example, the UE 120 may transmit an indication of an initial beam for a special cell and/or any SCells that have been added as part of the conditional handover procedure. The UE 120 may transmit the indication of one or more beams (e.g., the initial beam(s)) in an indication of the one or more SCells that have been added by the UE as part of the conditional handover (e.g., transmitted by the UE 120 as described above in connection with reference number 640). In some aspects, the UE 120 may transmit an indication of an activation status of SCell(s) associated with the target base station. For example, an SCell may be added, by the UE 120, in an activated state (e.g., where the UE 120 is enabled to transmit or receive data via the SCell) or in a deactivated state (e.g., where the UE 120 is not enabled to transmit or receive data via the SCell). The UE 120 may transmit, to the target base station, an indication of an activation status associated with one or more SCells associated with the target base station that have been added by the UE as part of the conditional handover. Additionally, in some aspects, a latency or delay associated with configuring carrier aggregation for the UE 120 may be reduced because the UE 120 is enabled to select a special cell and/or one or more SCells to be added for a target base station prior to completing the conditional handover procedure (e.g., rather than waiting for carrier aggregation to be configured after the conditional handover procedure is completed).

As a result, the UE 120 may be enabled to evaluate execution conditions for a conditional handover procedure that are based at least in part on beam-based measurements performed by the UE 120. This may improve a likelihood that a triggered conditional handover procedure is successful in a wireless network that uses beamformed communications. In some aspects, the UE 120 may be enabled to evaluate execution conditions for a conditional handover procedure that are based at least in part on a combination of special cell-based conditions and SCell-based conditions, thereby improving a likelihood that a connection with a candidate base station can be established with carrier aggregation as part of a conditional handover procedure. Establishing a connection with carrier aggregation may improve communication performance, data capacity, efficiency, and/or throughput, among other examples.

As indicated above, FIG. 6 is provided as an example. Other examples may differ from what is described with regard to FIG. 6.

Figure 7:
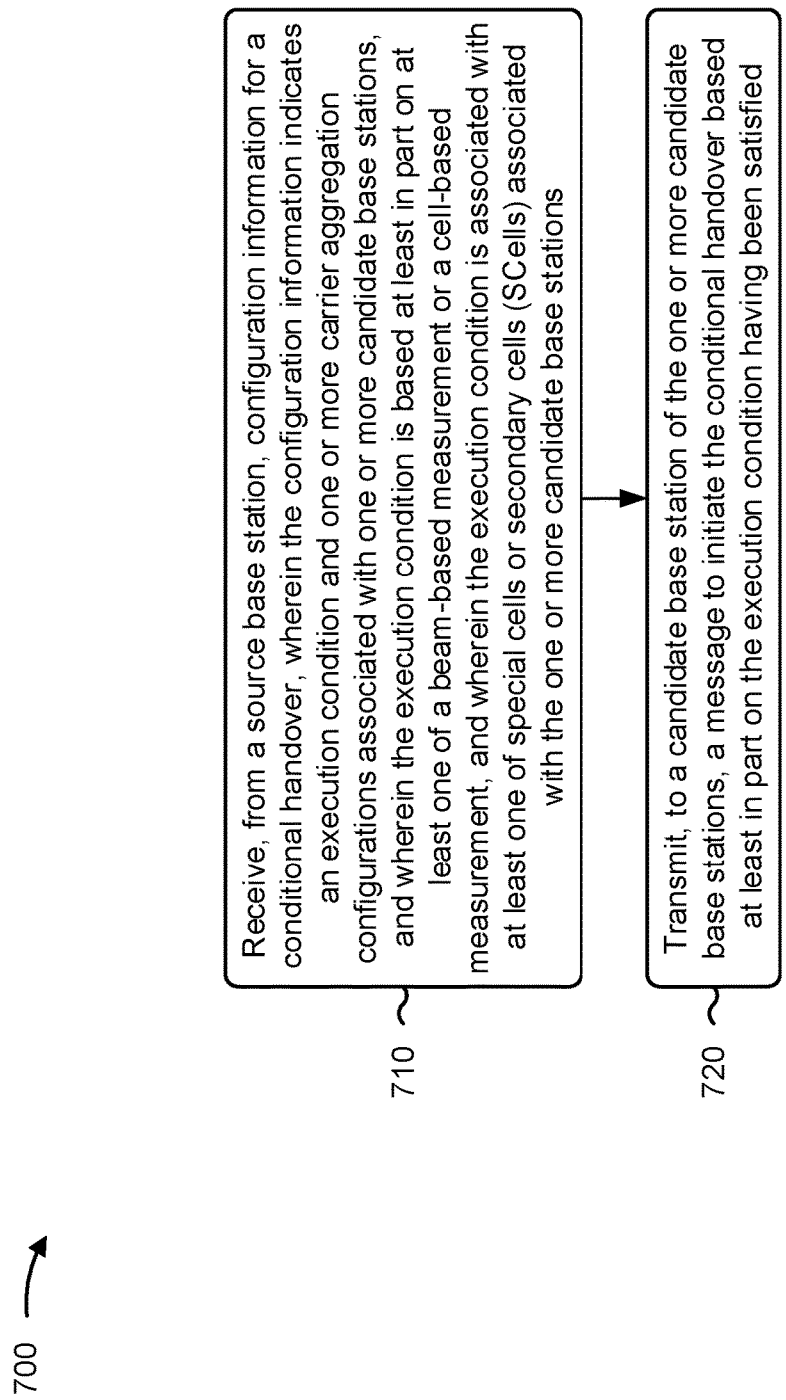
FIGS. 7 and 8 are diagrams illustrating example processes associated with mobility enhancements for conditional handovers and carrier aggregation, in accordance with the present disclosure.

FIG. 7 is a diagram illustrating an example process 700 performed, for example, by a UE, in accordance with the present disclosure. Example process 700 is an example where the UE (e.g., UE 120) performs operations associated with mobility enhancements for conditional handovers and carrier aggregation.

As shown in FIG. 7, in some aspects, process 700 may include receiving, from a source base station, configuration information for a conditional handover, wherein the configuration information indicates an execution condition and one or more carrier aggregation configurations associated with one or more candidate base stations, and wherein the execution condition is based at least in part on at least one of a beam-based measurement or a cell-based measurement, and where the execution condition is associated with at least one of special cells or SCells associated with the one or more candidate base stations (block 710). For example, the UE (e.g., using communication manager 140 and/or reception component 902, depicted in FIG. 9) may receive, from a source base station, configuration information for a conditional handover, wherein the configuration information indicates an execution condition and one or more carrier aggregation configurations associated with one or more candidate base stations, and wherein the execution condition is based at least in part on at least one of a beam-based measurement or a cell-based measurement, and where the execution condition is associated with at least one of special cells or SCells associated with the one or more candidate base stations, as described above.

As further shown in FIG. 7, in some aspects, process 700 may include transmitting, to a candidate base station of the one or more candidate base stations, a message to initiate the conditional handover based at least in part on the execution condition having been satisfied (block 720). For example, the UE (e.g., using communication manager 140 and/or transmission component 904, depicted in FIG. 9) may transmit, to a candidate base station of the one or more candidate base stations, a message to initiate the conditional handover based at least in part on the execution condition having been satisfied, as described above.

Process 700 may include additional aspects, such as any single aspect or any combination of aspects described below and/or in connection with one or more other processes described elsewhere herein.

In a first aspect, process 700 includes establishing a connection with the candidate base station using a carrier aggregation configuration, of the one or more carrier aggregation configurations, that is associated with the candidate base station.

In a second aspect, alone or in combination with the first aspect, the carrier aggregation configuration indicates a special cell and one or more SCells, associated with the candidate base station, that are added by the UE as part of the conditional handover.

In a third aspect, alone or in combination with one or more of the first and second aspects, the beam-based measurement includes at least one of a Layer 1 beam-based measurement, or a Layer 3 beam-based measurement.

In a fourth aspect, alone or in combination with one or more of the first through third aspects, receiving the configuration information for the conditional handover includes receiving, for the candidate base station of the one or more candidate base stations, an indication of a carrier aggregation configuration, of the one or more carrier aggregation configurations, that indicates a set of cells, associated with the candidate base station, that are candidate cells to be a special cell or SCells for the carrier aggregation configuration.

In a fifth aspect, alone or in combination with one or more of the first through fourth aspects, the set of cells includes at least one set including a special cell and one or more SCells associated with the special cell.

In a sixth aspect, alone or in combination with one or more of the first through fifth aspects, the execution condition is based at least in part on beam-based measurements of the special cells associated with the one or more candidate base stations.

In a seventh aspect, alone or in combination with one or more of the first through sixth aspects, process 700 includes receiving, from the candidate base station based at least in part on transmitting the message to initiate the conditional handover, an indication of one or more SCells to be added for a carrier aggregation configuration that is associated with the candidate base station.

In an eighth aspect, alone or in combination with one or more of the first through seventh aspects, the indication of the one or more SCells is received via an RRC configuration.

In a ninth aspect, alone or in combination with one or more of the first through eighth aspects, the execution condition is based at least in part on beam-based measurements of the special cells and the SCells associated with the one or more candidate base stations.

In a tenth aspect, alone or in combination with one or more of the first through ninth aspects, receiving the configuration information for the conditional handover includes receiving an indication of a first execution condition associated with the special cells associated with the one or more candidate base stations, and receiving an indication of a second execution condition associated with the SCells associated with the one or more candidate base stations.

In an eleventh aspect, alone or in combination with one or more of the first through tenth aspects, the execution condition indicates a first condition associated with the special cells and a second condition associated with the SCells, the conditional handover being triggered for the candidate base station is based at least in part on the first condition being satisfied for a special cell of the candidate base station, and an addition of an SCell, associated with the conditional handover with the candidate base station, is based at least in part on the second condition being satisfied for the SCell.

In a twelfth aspect, alone or in combination with one or more of the first through eleventh aspects, the execution condition indicates a first condition associated with the special cells and a second condition associated with the SCells, and the conditional handover being triggered for the candidate base station is based at least in part on the first condition being satisfied for a special cell of the candidate base station and the second condition being satisfied for at least one SCell of the candidate base station.

In a thirteenth aspect, alone or in combination with one or more of the first through twelfth aspects, the execution condition indicates a first condition associated with the special cells and a second condition associated with the SCells, and process 700 includes measuring signals associated with a special cell of the one or more candidate base stations, measuring signals associated with SCells of the one or more candidate base stations, wherein measurements of a first set of a special cell and one or more SCells from a first candidate base station and a second set of a special cell and one or more SCells from a second candidate base station both satisfy the first condition and the second condition, and selecting a target base station, from the first candidate base station and the second candidate base station, for the conditional handover based at least in part on at least one of a measurement value of special cells included in the first set and the second set, a measurement value of special cells and SCells included in the first set and the second set, or a quantity of SCells included in the first set and the second set.

In a fourteenth aspect, alone or in combination with one or more of the first through thirteenth aspects, the execution condition is based at least in part on a condition of an uplink beam associated with a downlink beam used for the beam-based measurement.

In a fifteenth aspect, alone or in combination with one or more of the first through fourteenth aspects, the condition of the uplink beam is an MPE condition associated with an MPE limit of the uplink beam that is associated with the downlink beam of the candidate base station that satisfies the execution condition.

In a sixteenth aspect, alone or in combination with one or more of the first through fifteenth aspects, process 700 includes selecting the candidate base station as a target base station for the conditional handover based at least in part on a condition of an uplink beam associated with a downlink beam of another candidate base station, wherein the other candidate base station is associated with a downlink measurement value that is greater than a downlink measurement value associated with the candidate base station.

In a seventeenth aspect, alone or in combination with one or more of the first through sixteenth aspects, process 700 includes transmitting, to the candidate base station, an indication of one or more SCells associated with the candidate base station that have been added by the UE as part of the conditional handover for a carrier aggregation configuration associated with the candidate base station.

In an eighteenth aspect, alone or in combination with one or more of the first through seventeenth aspects, the one or more SCells are added by the UE based at least in part on a measurement of the one or more SCells satisfying the execution condition.

In a nineteenth aspect, alone or in combination with one or more of the first through eighteenth aspects, transmitting the indication of the one or more SCells includes transmitting the indication via at least one of Layer 3 signaling, RRC signaling, MAC-CE signaling, Layer 1 signaling, UCI signaling, or a scheduling request resource associated with each SCell of the one or more SCells.

In a twentieth aspect, alone or in combination with one or more of the first through nineteenth aspects, process 700 includes establishing a connection with the candidate base station using a common beam for a special cell and one or more SCells associated with a carrier aggregation configuration, of the one or more carrier aggregation configurations, that is associated with the candidate base station.

In a twenty-first aspect, alone or in combination with one or more of the first through twentieth aspects, process 700 includes measuring a special cell and an SCell associated with the candidate base station associated with the conditional handover to identify a first beam associated with a highest measurement value for the special cell and a second beam associated with a highest measurement value for the SCell, and establishing a connection with the candidate base station using the first beam for the special cell and the second beam for the SCell.

In a twenty-second aspect, alone or in combination with one or more of the first through twenty-first aspects, process 700 includes transmitting, to the candidate base station, an indication of one or more beams to be used for a special cell and one or more SCells associated with the candidate base station.

In a twenty-third aspect, alone or in combination with one or more of the first through twenty-second aspects, the indication of one or more beams is included in an indication of the one or more SCells that have been added by the UE as part of the conditional handover.

In a twenty-fourth aspect, alone or in combination with one or more of the first through twenty-third aspects, process 700 includes transmitting, to the candidate base station, an indication of an activation status associated with one or more SCells associated with the candidate base station that have been added by the UE as part of the conditional handover.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
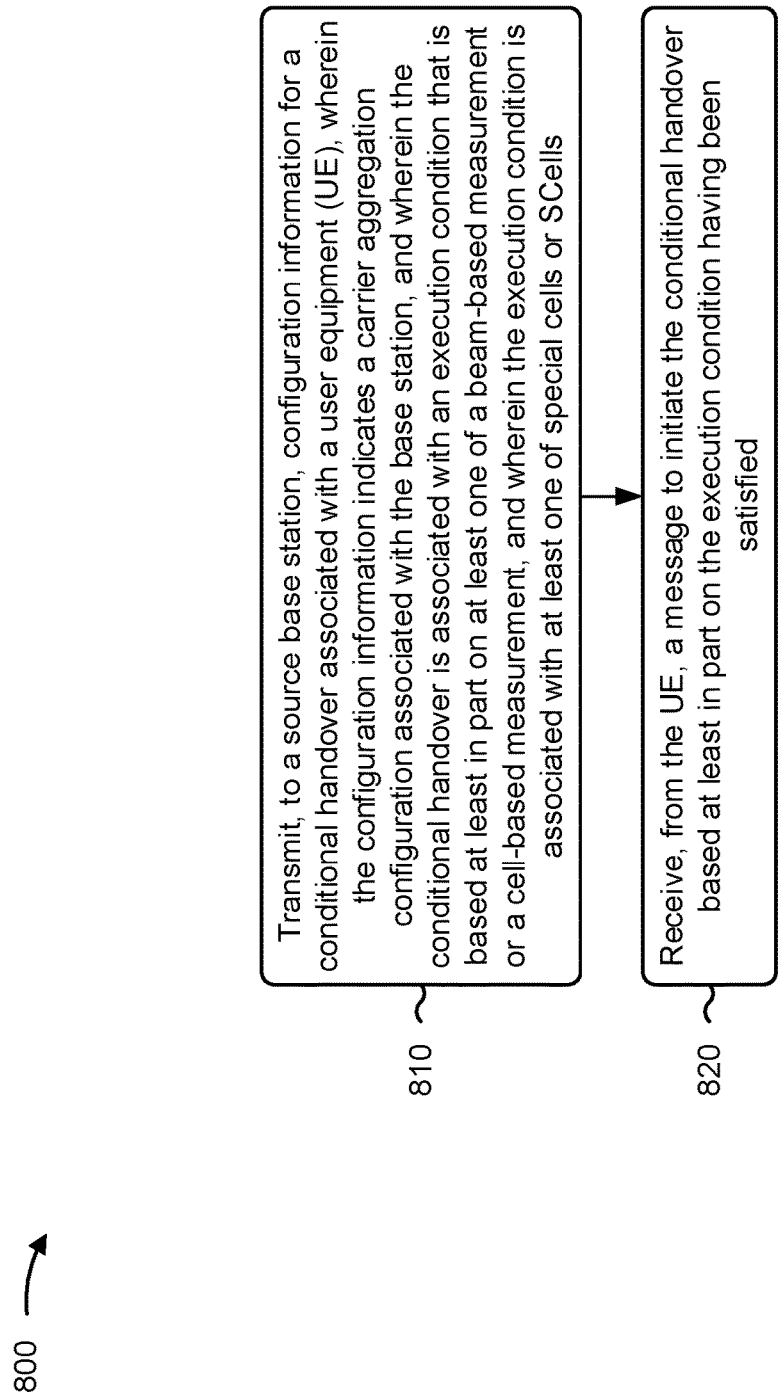

FIG. 8 is a diagram illustrating an example process 800 performed, for example, by a base station, in accordance with the present disclosure. Example process 800 is an example where the base station (e.g., base station 110) performs operations associated with mobility enhancements for conditional handovers and carrier aggregation.

As shown in FIG. 8, in some aspects, process 800 may include transmitting, to a source base station, configuration information for a conditional handover associated with a UE, wherein the configuration information indicates a carrier aggregation configuration associated with the base station, and wherein the conditional handover is associated with an execution condition that is based at least in part on at least one of a beam-based measurement or a cell-based measurement, and where the execution condition is associated with at least one of special cells or SCells (block 810). For example, the base station (e.g., using communication manager 150 and/or transmission component 1004, depicted in FIG. 10) may transmit, to a source base station, configuration information for a conditional handover associated with a UE, wherein the configuration information indicates a carrier aggregation configuration associated with the base station, and wherein the conditional handover is associated with an execution condition that is based at least in part on at least one of a beam-based measurement or a cell-based measurement, and where the execution condition is associated with at least one of special cells or SCells, as described above.

As further shown in FIG. 8, in some aspects, process 800 may include receiving, from the UE, a message to initiate the conditional handover based at least in part on the execution condition having been satisfied (block 820). For example, the base station (e.g., using communication manager 150 and/or reception component 1002, depicted in FIG. 10) may receive, from the UE, a message to initiate the conditional handover based at least in part on the execution condition having been satisfied, as described above.

Process 800 may include additional aspects, such as any single aspect or any combination of aspects described below and/or in connection with one or more other processes described elsewhere herein.

In a first aspect, process 800 includes establishing a connection with the UE using the carrier aggregation configuration.

In a second aspect, alone or in combination with the first aspect, the carrier aggregation configuration indicates one or more special cells and one or more SCells, associated with the base station, that are available to be added by the UE as part of the conditional handover.

In a third aspect, alone or in combination with one or more of the first and second aspects, the beam-based measurement includes at least one of a Layer 1 beam-based measurement, or a Layer 3 beam-based measurement.

In a fourth aspect, alone or in combination with one or more of the first through third aspects, transmitting the configuration information for the conditional handover includes transmitting, to the source base station, an indication of the carrier aggregation configuration that indicates a set of cells, associated with the base station, that are candidate cells to be a special cell or SCells for the carrier aggregation configuration.

In a fifth aspect, alone or in combination with one or more of the first through fourth aspects, the set of cells includes at least one set including a special cell and one or more SCells associated with the special cell.

In a sixth aspect, alone or in combination with one or more of the first through fifth aspects, the execution condition is based at least in part on beam-based measurements of the special cells associated with the base station.

In a seventh aspect, alone or in combination with one or more of the first through sixth aspects, process 800 includes transmitting, to the UE, an indication of one or more SCells to be added for a carrier aggregation configuration that is associated with the base station.

In an eighth aspect, alone or in combination with one or more of the first through seventh aspects, the indication of the one or more SCells is transmitted via an RRC configuration.

In a ninth aspect, alone or in combination with one or more of the first through eighth aspects, the execution condition is based at least in part on beam-based measurements of special cells and SCells associated with one or more candidate base stations, including the base station, for the conditional handover.

In a tenth aspect, alone or in combination with one or more of the first through ninth aspects, the execution condition indicates a first condition associated with the special cells and a second condition associated with the SCells, the conditional handover being triggered with the UE is based at least in part on the first condition being satisfied for a special cell of the base station, and an addition of an SCell, associated with the conditional handover with the base station, is based at least in part on the second condition being satisfied for the SCell.

In an eleventh aspect, alone or in combination with one or more of the first through tenth aspects, the execution condition indicates a first condition associated with the special cells and a second condition associated with the SCells, and the conditional handover being triggered with the UE is based at least in part on the first condition being satisfied for a special cell of the base station and the second condition being satisfied for at least one SCell of the base station.

In a twelfth aspect, alone or in combination with one or more of the first through eleventh aspects, the execution condition is based at least in part on a condition of an uplink beam associated with a downlink beam used for the beam-based measurement.

In a thirteenth aspect, alone or in combination with one or more of the first through twelfth aspects, the condition of the uplink beam is an MPE condition associated with an MPE limit of the uplink beam that is associated with the downlink beam of the base station that satisfies the execution condition.

In a fourteenth aspect, alone or in combination with one or more of the first through thirteenth aspects, process 800 includes receiving, from the UE, an indication of one or more SCells associated with the base station that have been added by the UE as part of the conditional handover for a carrier aggregation configuration associated with the base station.

In a fifteenth aspect, alone or in combination with one or more of the first through fourteenth aspects, the one or more SCells are added by the UE based at least in part on a measurement of the one or more SCells satisfying the execution condition.

In a sixteenth aspect, alone or in combination with one or more of the first through fifteenth aspects, receiving the indication of the one or more SCells includes receiving the indication via at least one of Layer 3 signaling, RRC signaling, MAC-CE signaling, Layer 1 signaling, UCI signaling, or a scheduling request resource associated with each SCell of the one or more SCells.

In a seventeenth aspect, alone or in combination with one or more of the first through sixteenth aspects, process 800 includes establishing a connection with the UE using a common beam for a special cell and one or more SCells associated with a carrier aggregation configuration, of the one or more carrier aggregation configurations, that is associated with the base station.

In an eighteenth aspect, alone or in combination with one or more of the first through seventeenth aspects, process 800 includes establishing a connection with the UE using a first beam for a special cell and a second beam for an SCell, wherein the first beam and the second beam are based at least in part on measurements performed by the UE.

In a nineteenth aspect, alone or in combination with one or more of the first through eighteenth aspects, process 800 includes receiving, from the UE, an indication of one or more beams to be used for a special cell and one or more SCells associated with the base station.

In a twentieth aspect, alone or in combination with one or more of the first through nineteenth aspects, the indication of one or more beams is included in an indication of the one or more SCells that have been added by the UE as part of the conditional handover.

In a twenty-first aspect, alone or in combination with one or more of the first through twentieth aspects, process 800 includes receiving, from the UE, an indication of an activation status associated with one or more SCells associated with the base station that have been added by the UE as part of the conditional handover.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
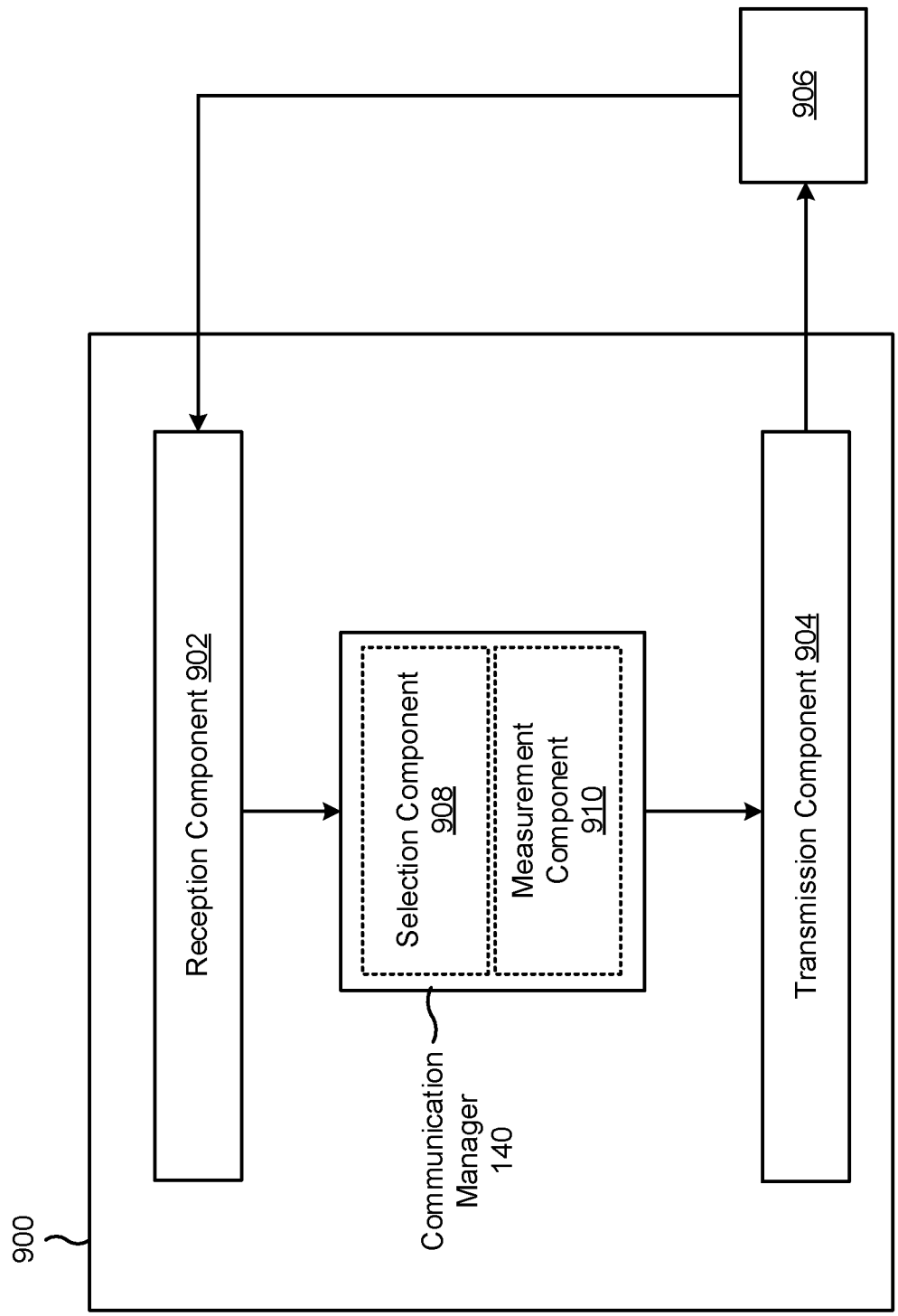
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a selection component 908, and/or a measurement component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a source base station, configuration information for a conditional handover, wherein the configuration information indicates an execution condition and one or more carrier aggregation configurations associated with one or more candidate base stations, and wherein the execution condition is based at least in part on at least one of a beam-based measurement or a cell-based measurement, and where the execution condition is associated with at least one of special cells or SCells associated with the one or more candidate base stations. The transmission component 904 may transmit, to a candidate base station of the one or more candidate base stations, a message to initiate the conditional handover based at least in part on the execution condition having been satisfied.

The reception component 902 and/or the transmission component 904 may establish a connection with the candidate base station using a carrier aggregation configuration, of the one or more carrier aggregation configurations, that is associated with the candidate base station.

The reception component 902 may receive, from the candidate base station based at least in part on transmitting the message to initiate the conditional handover, an indication of one or more SCells to be added for a carrier aggregation configuration that is associated with the candidate base station.

The selection component 908 may select the candidate base station as a target base station for the conditional handover based at least in part on a condition of an uplink beam associated with a downlink beam of another candidate base station, wherein the other candidate base station is associated with a downlink measurement value that is greater than a downlink measurement value associated with the candidate base station.

The transmission component 904 may transmit, to the candidate base station, an indication of one or more SCells associated with the candidate base station that have been added by the UE as part of the conditional handover for a carrier aggregation configuration associated with the candidate base station.

The reception component 902 and/or the transmission component 904 may establish a connection with the candidate base station using a common beam for a special cell and one or more SCells associated with a carrier aggregation configuration, of the one or more carrier aggregation configurations, that is associated with the candidate base station.

The measurement component 910 may measure a special cell and an SCell associated with the candidate base station associated with the conditional handover to identify a first beam associated with a highest measurement value for the special cell and a second beam associated with a highest measurement value for the SCell.

The reception component 902 and/or the transmission component 904 may establish a connection with the candidate base station using the first beam for the special cell and the second beam for the SCell.

The transmission component 904 may transmit, to the candidate base station, an indication of one or more beams to be used for a special cell and one or more SCells associated with the candidate base station.

The transmission component 904 may transmit, to the candidate base station, an indication of an activation status associated with one or more SCells associated with the candidate base station that have been added by the UE as part of the conditional handover.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
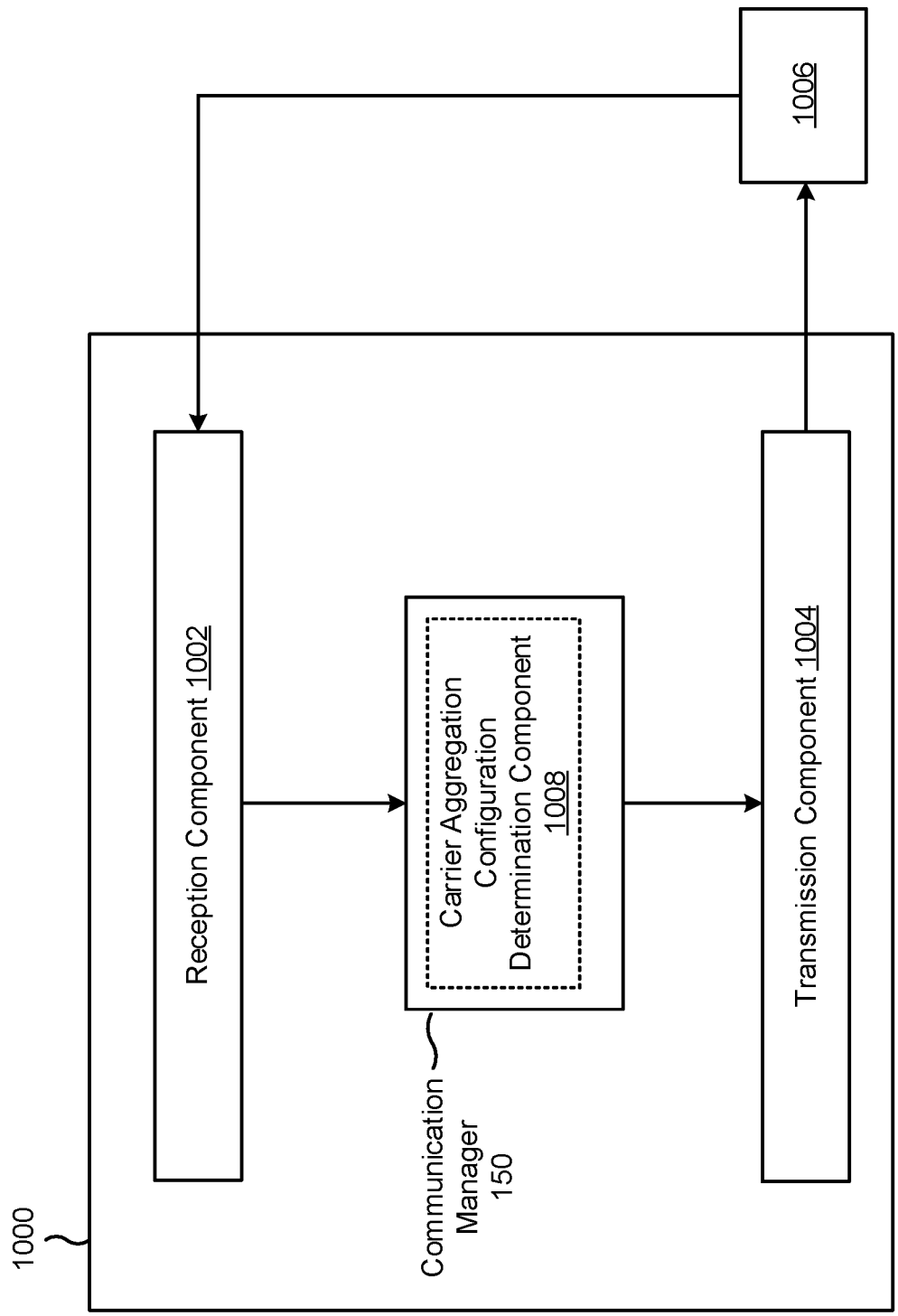

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a carrier aggregation configuration determination component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit, to a source base station, configuration information for a conditional handover associated with a UE, wherein the configuration information indicates a carrier aggregation configuration associated with the base station, and wherein the conditional handover is associated with an execution condition that is based at least in part on at least one of a beam-based measurement or a cell-based measurement, and where the execution condition is associated with at least one of special cells or SCells associated with the one or more candidate base stations. The reception component 1002 may receive, from the UE, a message to initiate the conditional handover based at least in part on the execution condition having been satisfied.

The carrier aggregation configuration determination component 1008 may determine the carrier aggregation configuration associated with the base station. In some aspects, the carrier aggregation configuration determination component 1008 may determine the carrier aggregation configuration based at least in part on measurements performed by the UE (e.g., prior to the conditional handover being configured). In some aspects, the carrier aggregation configuration determination component 1008 may determine an updated carrier aggregation configuration based at least in part on measurements performed by the UE after the conditional handover is configured at the UE.

The reception component 1002 and/or transmission component 1004 may establish a connection with the UE using the carrier aggregation configuration.

The transmission component 1004 may transmit, to the UE, an indication of one or more SCells to be added for a carrier aggregation configuration that is associated with the base station.

The reception component 1002 may receive, from the UE, an indication of one or more SCells associated with the base station that have been added by the UE as part of the conditional handover for a carrier aggregation configuration associated with the base station.

The reception component 1002 and/or transmission component 1004 may establish a connection with the UE using a common beam for a special cell and one or more SCells associated with a carrier aggregation configuration, of the one or more carrier aggregation configurations, that is associated with the base station.

The reception component 1002 and/or transmission component 1004 may establish a connection with the UE using a first beam for a special cell and a second beam for an SCell, wherein the first beam and the second beam are based at least in part on measurements performed by the UE.

The reception component 1002 may receive, from the UE, an indication of one or more beams to be used for a special cell and one or more SCells associated with the base station.

The reception component 1002 may receive, from the UE, an indication of an activation status associated with one or more SCells associated with the base station that have been added by the UE as part of the conditional handover.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a source base station, configuration information for a conditional handover, wherein the configuration information indicates an execution condition and one or more carrier aggregation configurations associated with one or more candidate base stations, and wherein the execution condition is based at least in part on at least one of a beam-based measurement or a cell-based measurement, and wherein the execution condition is associated with at least one of special cells or secondary cells (SCells) associated with the one or more candidate base stations; and transmitting, to a candidate base station of the one or more candidate base stations, a message to initiate the conditional handover based at least in part on the execution condition having been satisfied.

Aspect 2: The method of Aspect 1, further comprising: establishing a connection with the candidate base station using a carrier aggregation configuration, of the one or more carrier aggregation configurations, that is associated with the candidate base station.

Aspect 3: The method of Aspect 2, wherein the carrier aggregation configuration indicates a special cell and one or more SCells, associated with the candidate base station, that are added by the UE as part of the conditional handover.

Aspect 4: The method of any of Aspects 1-3, wherein the beam-based measurement includes at least one of: a Layer 1 beam-based measurement, or a Layer 3 beam-based measurement.

Aspect 5: The method of any of Aspects 1-4, wherein receiving the configuration information for the conditional handover comprises: receiving, for the candidate base station of the one or more candidate base stations, an indication of a carrier aggregation configuration, of the one or more carrier aggregation configurations, that indicates a set of cells, associated with the candidate base station, that are candidate cells to be a special cell or SCells for the carrier aggregation configuration.

Aspect 6: The method of Aspect 5, wherein the set of cells includes at least one set including a special cell and one or more SCells associated with the special cell.

Aspect 7: The method of any of Aspects 1-6, wherein the execution condition is based at least in part on beam-based measurements of the special cells associated with the one or more candidate base stations.

Aspect 8: The method of Aspect 7, further comprising: receiving, from the candidate base station based at least in part on transmitting the message to initiate the conditional handover, an indication of one or more SCells to be added for a carrier aggregation configuration that is associated with the candidate base station.

Aspect 9: The method of Aspect 8, wherein the indication of the one or more SCells is received via a radio resource control (RRC) configuration.

Aspect 10: The method of any of Aspects 1-9, wherein the execution condition is based at least in part on beam-based measurements of the special cells and the SCells associated with the one or more candidate base stations.

Aspect 11: The method of any of Aspects 1-10, wherein receiving the configuration information for the conditional handover comprises: receiving an indication of a first execution condition associated with the special cells associated with the one or more candidate base stations; and receiving an indication of a second execution condition associated with the SCells associated with the one or more candidate base stations.

Aspect 12: The method of any of Aspects 1-11, wherein the execution condition indicates a first condition associated with the special cells and a second condition associated with the SCells, wherein the conditional handover being triggered for the candidate base station is based at least in part on the first condition being satisfied for a special cell of the candidate base station, and wherein an addition of an SCell, associated with the conditional handover with the candidate base station, is based at least in part on the second condition being satisfied for the SCell.

Aspect 13: The method of any of Aspects 1-11, wherein the execution condition indicates a first condition associated with the special cells and a second condition associated with the SCells, and wherein the conditional handover being triggered for the candidate base station is based at least in part on the first condition being satisfied for a special cell of the candidate base station and the second condition being satisfied for at least one SCell of the candidate base station.

Aspect 14: The method of any of Aspects 1-13, wherein the execution condition indicates a first condition associated with the special cells and a second condition associated with the SCells, the method further comprising: measuring signals associated with a special cell of the one or more candidate base stations; measuring signals associated with SCells of the one or more candidate base stations, wherein measurements of a first set of a special cell and one or more SCells from a first candidate base station and a second set of a special cell and one or more SCells from a second candidate base station both satisfy the first condition and the second condition; and selecting a target base station, from the first candidate base station and the second candidate base station, for the conditional handover based at least in part on at least one of: a measurement value of special cells included in the first set and the second set, a measurement value of special cells and SCells included in the first set and the second set, or a quantity of SCells included in the first set and the second set.

Aspect 15: The method of any of Aspects 1-14, wherein the execution condition is based at least in part on a condition of an uplink beam associated with a downlink beam used for the beam-based measurement.

Aspect 16: The method of Aspect 15, wherein the condition of the uplink beam is a maximum permissible exposure (MPE) condition associated with an MPE limit of the uplink beam that is associated with the downlink beam of the candidate base station that satisfies the execution condition.

Aspect 17: The method of Aspect 16, further comprising: selecting the candidate base station as a target base station for the conditional handover based at least in part on a condition of an uplink beam associated with a downlink beam of another candidate base station, wherein the other candidate base station is associated with a downlink measurement value that is greater than a downlink measurement value associated with the candidate base station.

Aspect 18: The method of any of Aspects 1-17, further comprising: transmitting, to the candidate base station, an indication of one or more secondary cells (SCells) associated with the candidate base station that have been added by the UE as part of the conditional handover for a carrier aggregation configuration associated with the candidate base station.

Aspect 19: The method of Aspect 18, wherein the one or more SCells are added by the UE based at least in part on a measurement of the one or more SCells satisfying the execution condition.

Aspect 20: The method of any of Aspects 18-19, wherein transmitting the indication of the one or more SCells comprises: transmitting the indication via at least one of: Layer 3 signaling, radio resource control (RRC) signaling, medium access control (MAC) control element (MAC-CE) signaling, Layer 1 signaling, uplink control information (UCI) signaling, or a scheduling request resource associated with each SCell of the one or more SCells.

Aspect 21: The method of any of Aspects 1-20, further comprising: establishing a connection with the candidate base station using a common beam for a special cell and one or more SCells associated with a carrier aggregation configuration, of the one or more carrier aggregation configurations, that is associated with the candidate base station.

Aspect 22: The method of any of Aspects 1-21, further comprising: measuring a special cell and an SCell associated with the candidate base station associated with the conditional handover to identify a first beam associated with a highest measurement value for the special cell and a second beam associated with a highest measurement value for the SCell; and establishing a connection with the candidate base station using the first beam for the special cell and the second beam for the SCell.

Aspect 23: The method of any of Aspects 1-22, further comprising: transmitting, to the candidate base station, an indication of one or more beams to be used for a special cell and one or more SCells associated with the candidate base station.

Aspect 24: The method of Aspect 23, wherein the indication of one or more beams is included in an indication of the one or more SCells that have been added by the UE as part of the conditional handover.

Aspect 25: The method of any of Aspects 1-24, further comprising: transmitting, to the candidate base station, an indication of an activation status associated with one or more SCells associated with the candidate base station that have been added by the UE as part of the conditional handover.

Aspect 26: A method of wireless communication performed by a base station, comprising: transmitting, to a source base station, configuration information for a conditional handover associated with a user equipment (UE), wherein the configuration information indicates a carrier aggregation configuration associated with the base station, and wherein the conditional handover is associated with an execution condition that is based at least in part on at least one of a beam-based measurement or a cell-based measurement, and wherein the execution condition is associated with at least one of special cells or secondary cells (SCells); and receiving, from the UE, a message to initiate the conditional handover based at least in part on the execution condition having been satisfied.

Aspect 27: The method of Aspect 26, further comprising: establishing a connection with the UE using the carrier aggregation configuration.

Aspect 28: The method of any of Aspects 26-27, wherein the carrier aggregation configuration indicates one or more special cells and one or more SCells, associated with the base station, that are available to be added by the UE as part of the conditional handover.

Aspect 29: The method of any of Aspects 26-28, wherein the beam-based measurement includes at least one of: a Layer 1 beam-based measurement, or a Layer 3 beam-based measurement.

Aspect 30: The method of any of Aspects 26-29, wherein transmitting the configuration information for the conditional handover comprises: transmitting, to the source base station, an indication of the carrier aggregation configuration that indicates a set of cells, associated with the base station, that are candidate cells to be a special cell or SCells for the carrier aggregation configuration.

Aspect 31: The method of Aspect 30, wherein the set of cells includes at least one set including a special cell and one or more SCells associated with the special cell.

Aspect 32: The method of any of Aspects 26-31, wherein the execution condition is based at least in part on beam-based measurements of special cells associated with the base station.

Aspect 33: The method of Aspect 32, further comprising: transmitting, to the UE, an indication of one or more SCells to be added for a carrier aggregation configuration that is associated with the base station.

Aspect 34: The method of Aspect 33, wherein the indication of the one or more SCells is transmitted via a radio resource control (RRC) configuration.

Aspect 35: The method of any of Aspects 26-31, wherein the execution condition is based at least in part on beam-based measurements of special cells and SCells associated with one or more candidate base stations, including the base station, for the conditional handover.

Aspect 36: The method of any of Aspects 26-35, wherein the execution condition indicates a first condition associated with the special cells and a second condition associated with the SCells, wherein the conditional handover being triggered with the UE is based at least in part on the first condition being satisfied for a special cell of the base station, and wherein an addition of an SCell, associated with the conditional handover with the base station, is based at least in part on the second condition being satisfied for the SCell.

Aspect 37: The method of any of Aspects 26-35, wherein the execution condition indicates a first condition associated with the special cells and a second condition associated with the SCells, and wherein the conditional handover being triggered with the UE is based at least in part on the first condition being satisfied for a special cell of the base station and the second condition being satisfied for at least one SCell of the base station.

Aspect 38: The method of any of Aspects 26-37, wherein the execution condition is based at least in part on a condition of an uplink beam associated with a downlink beam used for the beam-based measurement.

Aspect 39: The method of Aspect 38, wherein the condition of the uplink beam is a maximum permissible exposure (MPE) condition associated with an MPE limit of the uplink beam that is associated with the downlink beam of the base station that satisfies the execution condition.

Aspect 40: The method of any of Aspects 26-39, further comprising: receiving, from the UE, an indication of one or more SCells associated with the base station that have been added by the UE as part of the conditional handover for a carrier aggregation configuration associated with the base station.

Aspect 41: The method of Aspect 40, wherein the one or more SCells are added by the UE based at least in part on a measurement of the one or more SCells satisfying the execution condition.

Aspect 42: The method of any of Aspects 40-41, wherein receiving the indication of the one or more SCells comprises: receiving the indication via at least one of: Layer 3 signaling, radio resource control (RRC) signaling, medium access control (MAC) control element (MAC-CE) signaling, Layer 1 signaling, uplink control information (UCI) signaling, or a scheduling request resource associated with each SCell of the one or more SCells.

Aspect 43: The method of any of Aspects 26-42, further comprising: establishing a connection with the UE using a common beam for a special cell and one or more SCells associated with a carrier aggregation configuration, of the one or more carrier aggregation configurations, that is associated with the base station.

Aspect 44: The method of any of Aspects 26-43, further comprising: establishing a connection with the UE using a first beam for a special cell and a second beam for an SCell, wherein the first beam and the second beam are based at least in part on measurements performed by the UE.

Aspect 45: The method of any of Aspects 26-44, further comprising: receiving, from the UE, an indication of one or more beams to be used for a special cell and one or more SCells associated with the base station.

Aspect 46: The method of Aspect 45, wherein the indication of one or more beams is included in an indication of the one or more SCells that have been added by the UE as part of the conditional handover.

Aspect 47: The method of any of Aspects 26-46, further comprising: receiving, from the UE, an indication of an activation status associated with one or more SCells associated with the base station that have been added by the UE as part of the conditional handover.

Aspect 48: An apparatus for wireless communication at a device, comprising a processor; memory coupled with the processor; and instructions stored in the memory and executable by the processor to cause the apparatus to perform the method of one or more of Aspects 1-25.

Aspect 49: A device for wireless communication, comprising a memory and one or more processors coupled to the memory, the one or more processors configured to perform the method of one or more of Aspects 1-25.

Aspect 50: An apparatus for wireless communication, comprising at least one means for performing the method of one or more of Aspects 1-25.

Aspect 51: A non-transitory computer-readable medium storing code for wireless communication, the code comprising instructions executable by a processor to perform the method of one or more of Aspects 1-25.

Aspect 52: A non-transitory computer-readable medium storing a set of instructions for wireless communication, the set of instructions comprising one or more instructions that, when executed by one or more processors of a device, cause the device to perform the method of one or more of Aspects 1-25.

Aspect 53: An apparatus for wireless communication at a device, comprising a processor; memory coupled with the processor; and instructions stored in the memory and executable by the processor to cause the apparatus to perform the method of one or more of Aspects 26-47.

Aspect 54: A device for wireless communication, comprising a memory and one or more processors coupled to the memory, the one or more processors configured to perform the method of one or more of Aspects 26-47.

Aspect 55: An apparatus for wireless communication, comprising at least one means for performing the method of one or more of Aspects 26-47.

Aspect 56: A non-transitory computer-readable medium storing code for wireless communication, the code comprising instructions executable by a processor to perform the method of one or more of Aspects 26-47.

Aspect 57: A non-transitory computer-readable medium storing a set of instructions for wireless communication, the set of instructions comprising one or more instructions that, when executed by one or more processors of a device, cause the device to perform the method of one or more of Aspects 26-47.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive, from a source base station, configuration information for a conditional handover, wherein the configuration information indicates an execution condition, that is based at least in part on a beam-based measurement or a cell-based measurement, and that is associated with at least one of special cells or secondary cells (SCells) associated with one or more candidate base stations, and wherein the configuration information indicates one or more carrier aggregation configurations associated with the one or more candidate base stations;
select, based at least in part on the configuration information, one or more cells to be included in a carrier aggregation configuration of a candidate base station of the one or more candidate base stations, wherein the carrier aggregation configuration is applied prior to completing the conditional handover; and
transmit, to the candidate base station, a message to initiate the conditional handover based at least in part on the execution condition having been satisfied, wherein the carrier aggregation configuration is applied as part of performing the conditional handover.

2. The UE of claim 1, wherein the one or more processors are further configured to:
establish a connection with the candidate base station using the carrier aggregation configuration.

3. The UE of claim 1, wherein the beam-based measurement includes at least one of:
a Layer 1 beam-based measurement, or
a Layer 3 beam-based measurement.

4. The UE of claim 1, wherein the one or more processors, to receive the configuration information for the conditional handover, are configured to:
receive, for the candidate base station of the one or more candidate base stations, an indication of the carrier aggregation configuration that indicates a set of cells, associated with the candidate base station, that are candidate cells to be a special cell or SCells for the carrier aggregation configuration.

5. The UE of claim 1, wherein the execution condition is based at least in part on beam-based measurements of the special cells associated with the one or more candidate base stations.

6. The UE of claim 1, wherein the execution condition is based at least in part on beam-based measurements of special cells and SCells associated with the one or more candidate base stations.

7. The UE of claim 1, wherein the one or more processors, to receive the configuration information for the conditional handover, are configured to:
receive an indication of a first execution condition associated with the special cells associated with the one or more candidate base stations; and
receive an indication of a second execution condition associated with the SCells associated with the one or more candidate base stations.

8. The UE of claim 1, wherein the execution condition indicates a first condition associated with the special cells and a second condition associated with the SCells,
wherein the conditional handover being triggered for the candidate base station is based at least in part on the first condition being satisfied for a special cell of the candidate base station, and
wherein an addition of an SCell, associated with the conditional handover with the candidate base station, is based at least in part on the second condition being satisfied for the SCell.

9. The UE of claim 1, wherein the execution condition indicates a first condition associated with the special cells and a second condition associated with the SCells, and
wherein the conditional handover being triggered for the candidate base station is based at least in part on the first condition being satisfied for a special cell of the candidate base station and the second condition being satisfied for at least one SCell of the candidate base station.

10. The UE of claim 1, wherein the execution condition indicates a first condition associated with the special cells and a second condition associated with the SCells, and wherein the one or more processors are further configured to:
measure signals associated with a special cell of the one or more candidate base stations;
measure signals associated with SCells of the one or more candidate base stations, wherein measurements of a first set of a special cell and one or more SCells from a first candidate base station and a second set of a special cell and one or more SCells from a second candidate base station both satisfy the first condition and the second condition; and
select a target base station, from the first candidate base station and the second candidate base station, for the conditional handover based at least in part on at least one of:
a measurement value of special cells included in the first set and the second set,
a measurement value of special cells and SCells included in the first set and the second set, or
a quantity of SCells included in the first set and the second set.

11. The UE of claim 1, wherein the execution condition is based at least in part on a condition of an uplink beam associated with a downlink beam used for the beam-based measurement.

12. The UE of claim 1, wherein the one or more processors are further configured to:
transmit, to the candidate base station, an indication of one or more SCells associated with the candidate base station that have been added by the UE as part of the conditional handover for the carrier aggregation configuration.

13. The UE of claim 1, wherein the one or more processors are further configured to:
transmit, to the candidate base station, an indication of one or more beams to be used for a special cell and one or more SCells associated with the candidate base station.

14. The UE of claim 1, wherein the one or more processors are further configured to:
transmit, to the candidate base station, an indication of an activation status associated with one or more SCells associated with the candidate base station that have been added by the UE as part of the conditional handover.

15. A method of wireless communication performed by a user equipment (UE), comprising:
receiving, from a source base station, configuration information for a conditional handover, wherein the configuration information indicates an execution condition, that is based at least in part on a beam-based measurement or a cell-based measurement, and that is associated with at least one of special cells or secondary cells (SCells) associated with one or more candidate base stations, and wherein the configuration information indicates one or more carrier aggregation configurations associated with the one or more candidate base stations;
selecting, based at least in part on the configuration information, one or more cells to be included in a carrier aggregation configuration of a candidate base station of the one or more candidate base stations, wherein the carrier aggregation configuration is applied prior to completing the conditional handover; and
transmitting, to the candidate base station, a message to initiate the conditional handover based at least in part on the execution condition having been satisfied, wherein the carrier aggregation configuration is applied as part of performing the conditional handover.

16. The method of claim 15, further comprising:
establishing a connection with the candidate base station using the carrier aggregation configuration.

17. The method of claim 15, wherein the beam-based measurement includes at least one of:
a Layer 1 beam-based measurement, or
a Layer 3 beam-based measurement.

18. The method of claim 15, wherein receiving the configuration information for the conditional handover comprises:
receiving, for the candidate base station of the one or more candidate base stations, an indication of the carrier aggregation configuration that indicates a set of cells, associated with the candidate base station, that are candidate cells to be a special cell or SCells for the carrier aggregation configuration.

19. The method of claim 15, wherein the execution condition is based at least in part on beam-based measurements of special cells associated with the one or more candidate base stations.

20. The method of claim 15, wherein the execution condition is based at least in part on beam-based measurements of the special cells and the SCells associated with the one or more candidate base stations.

21. The method of claim 15, wherein receiving the configuration information for the conditional handover comprises:
receiving an indication of a first execution condition associated with the special cells associated with the one or more candidate base stations; and
receiving an indication of a second execution condition associated with the SCells associated with the one or more candidate base stations.

22. The method of claim 15, wherein the execution condition indicates a first condition associated with the special cells and a second condition associated with the SCells,
wherein the conditional handover being triggered for the candidate base station is based at least in part on the first condition being satisfied for a special cell of the candidate base station, and
wherein an addition of an SCell, associated with the conditional handover with the candidate base station, is based at least in part on the second condition being satisfied for the SCell.

23. The method of claim 15, wherein the execution condition indicates a first condition associated with the special cells and a second condition associated with the SCells, and
wherein the conditional handover being triggered for the candidate base station is based at least in part on the first condition being satisfied for a special cell of the candidate base station and the second condition being satisfied for at least one SCell of the candidate base station.

24. The method of claim 15, wherein the execution condition indicates a first condition associated with the special cells and a second condition associated with the SCells, the method further comprising:
measuring signals associated with a special cell of the one or more candidate base stations;
measuring signals associated with SCells of the one or more candidate base stations, wherein measurements of a first set of a special cell and one or more SCells from a first candidate base station and a second set of a special cell and one or more SCells from a second candidate base station both satisfy the first condition and the second condition; and
selecting a target base station, from the first candidate base station and the second candidate base station, for the conditional handover based at least in part on at least one of:
a measurement value of special cells included in the first set and the second set,
a measurement value of special cells and SCells included in the first set and the second set, or
a quantity of SCells included in the first set and the second set.

25. The method of claim 15, wherein the execution condition is based at least in part on a condition of an uplink beam associated with a downlink beam used for the beam-based measurement.

26. The method of claim 15, further comprising:
transmitting, to the candidate base station, an indication of one or more SCells associated with the candidate base station that have been added by the UE as part of the conditional handover for the carrier aggregation configuration.

27. The method of claim 15, further comprising:
transmitting, to the candidate base station, an indication of one or more beams to be used for a special cell and one or more SCells associated with the candidate base station.

28. The method of claim 15, further comprising:
transmitting, to the candidate base station, an indication of an activation status associated with one or more SCells associated with the candidate base station that have been added by the UE as part of the conditional handover.

29. A non-transitory computer-readable medium storing a set of instructions for wireless communication, the set of instructions comprising:
one or more instructions that, when executed by one or more processors of a user equipment (UE), cause the UE to:
receive, from a source base station, configuration information for a conditional handover, wherein the configuration information indicates an execution condition, that is based at least in part on a beam-based measurement or a cell-based measurement, and that is associated with at least one of special cells or secondary cells (SCells) associated with one or more candidate base stations, and wherein the configuration information indicates one or more carrier aggregation configurations associated with the one or more candidate base stations;
select, based at least in part on the configuration information, one or more cells to be included in a carrier aggregation configuration of a candidate base station of the one or more candidate base stations, wherein the carrier aggregation configuration is applied prior to completing the conditional handover; and
transmit, to the candidate base station, a message to initiate the conditional handover based at least in part on the execution condition having been satisfied, wherein the carrier aggregation configuration is applied as part of performing the conditional handover.

30. An apparatus for wireless communication, comprising:
means for receiving, from a source base station, configuration information for a conditional handover, wherein the configuration information indicates an execution condition, that is based at least in part on a beam-based measurement or a cell-based measurement, and that is associated with at least one of special cells or secondary cells (SCells) associated with one or more candidate base stations, and wherein the configuration information indicates one or more carrier aggregation configurations associated with the one or more candidate base stations;
means for selecting, based at least in part on the configuration information, one or more cells to be included in a carrier aggregation configuration of a candidate base station of the one or more candidate base stations, wherein the carrier aggregation configuration is applied prior to completing the conditional handover; and
means for transmitting, to the candidate base station, a message to initiate the conditional handover based at least in part on the execution condition having been satisfied, wherein the carrier aggregation configuration is applied as part of performing the conditional handover.

* * * * *